US012387654B2

(12) United States Patent
Ishizawa et al.

(10) Patent No.: US 12,387,654 B2
(45) Date of Patent: Aug. 12, 2025

(54) CIRCUIT APPARATUS AND DISPLAY SYSTEM

(71) Applicant: SEIKO EPSON CORPORATION, Tokyo (JP)

(72) Inventors: Kodai Ishizawa, Munich (DE); Mitsuo Ishiguro, Chino (JP)

(73) Assignee: SEIKO EPSON CORPORATION (JP)

(*) Notice: Subject to any disclaimer, the term of this patent is extended or adjusted under 35 U.S.C. 154(b) by 202 days.

(21) Appl. No.: 18/458,802

(22) Filed: Aug. 30, 2023

(65) Prior Publication Data

US 2024/0078954 A1 Mar. 7, 2024

(30) Foreign Application Priority Data

Sep. 5, 2022 (JP) ................................. 2022-140563

(51) Int. Cl.
*G09G 3/20* (2006.01)
*G09G 3/34* (2006.01)

(52) U.S. Cl.
CPC ......... *G09G 3/2055* (2013.01); *G09G 3/3426* (2013.01); *G09G 2320/0242* (2013.01); *G09G 2360/16* (2013.01); *G09G 2380/10* (2013.01)

(58) Field of Classification Search
CPC ............... G09G 3/2055; G09G 3/3426; G09G 2320/0242; G09G 2360/16; G09G 2380/10; G09G 2320/0233; G09G 3/2048; G09G 2320/0257; G09G 2320/0673; G09G 2358/00; G09G 2370/00
See application file for complete search history.

(56) References Cited

U.S. PATENT DOCUMENTS

| | | | | |
|---|---|---|---|---|
| 2009/0009105 A1 | | 1/2009 | Sakurai | |
| 2009/0121993 A1* | | 5/2009 | Masumura | G09G 3/3614 345/88 |
| 2012/0154454 A1* | | 6/2012 | Ohishi | G09G 3/342 345/99 |
| 2013/0251285 A1* | | 9/2013 | Kurokawa | G06T 5/40 382/274 |

(Continued)

FOREIGN PATENT DOCUMENTS

| | | |
|---|---|---|
| JP | 2009-016104 A | 1/2009 |
| JP | 2009-271169 A | 11/2009 |

*Primary Examiner* — Kee M Tung
*Assistant Examiner* — Xiaoming Wei
(74) *Attorney, Agent, or Firm* — Harness, Dickey & Pierce, P.L.C.

(57) ABSTRACT

A color information extraction section extracts color information from image information. A luminance information extraction section extracts luminance information for controlling the luminance of a backlight based on the color information. A dithering section adds bits for dithering to the lower bit side of the luminance information and outputs the luminance information after the addition to a display apparatus as output luminance information. An image color correction section corrects the color of the image information based on the color information and outputs the corrected image information to the display apparatus as output image information. An upper bit comparison section compares upper bits of the luminance information, upper bits of the output luminance information, and upper bits of the output image information with each other.

14 Claims, 13 Drawing Sheets

(56) References Cited

U.S. PATENT DOCUMENTS

| | | | | |
|---|---|---|---|---|
| 2015/0294441 | A1* | 10/2015 | Sakaigawa | G09G 5/10 345/618 |
| 2020/0342796 | A1* | 10/2020 | Kobayashi | G09G 3/2096 |
| 2022/0224821 | A1* | 7/2022 | Nozaki | H04N 23/71 |

* cited by examiner

CIRCUIT APPARATUS AND DISPLAY SYSTEM

The present application is based on, and claims priority from JP Application Serial Number 2022-140563, filed Sep. 5, 2022, the disclosure of which is hereby incorporated by reference herein in its entirety.

BACKGROUND

1. Technical Field

The present disclosure relates to a circuit apparatus, a display system, and the like.

2. Related Art

There has been a known display apparatus including a light source, such as an LED. JP-A-2009-016104 discloses a method for controlling the light source with a drive signal formed of (n+m) bits, the upper n bits and the lower m bits providing different control contents.

JP-A-2009-016104 is an example of the related art.

There has, however, been no proposed method for checking whether data on controlling the light source of the display apparatus is correctly transmitted and received by comparing the upper bits of the light source control signal with the upper bits of image information.

SUMMARY

An aspect of the present disclosure relates to a circuit apparatus that controls a display apparatus including a backlight and an electro-optical panel, the circuit apparatus including a color information extraction section that extracts color information from image information, a luminance information extraction section that extracts luminance information for controlling luminance of the backlight based on the color information, a dithering section that adds bits for dithering to a lower bit side of the luminance information and outputs the luminance information after the addition to the display apparatus as output luminance information, an image color correction section that corrects a color of the image information and outputs the corrected image information as output image information to the display apparatus, and an upper bit comparison section that compares upper bits of the luminance information, upper bits of the output luminance information, and upper bits of the output image information with each other.

Another aspect of the present disclosure relates to a display system including the circuit apparatus and the display apparatus described above.

DESCRIPTION OF EMBODIMENTS

A preferable embodiment of the present disclosure will be described below in detail. It is not intended that the present embodiment described below unduly limits the contents described in the claims, and all configurations described in the present embodiment are not necessarily essential configuration requirements.

Figure 1:
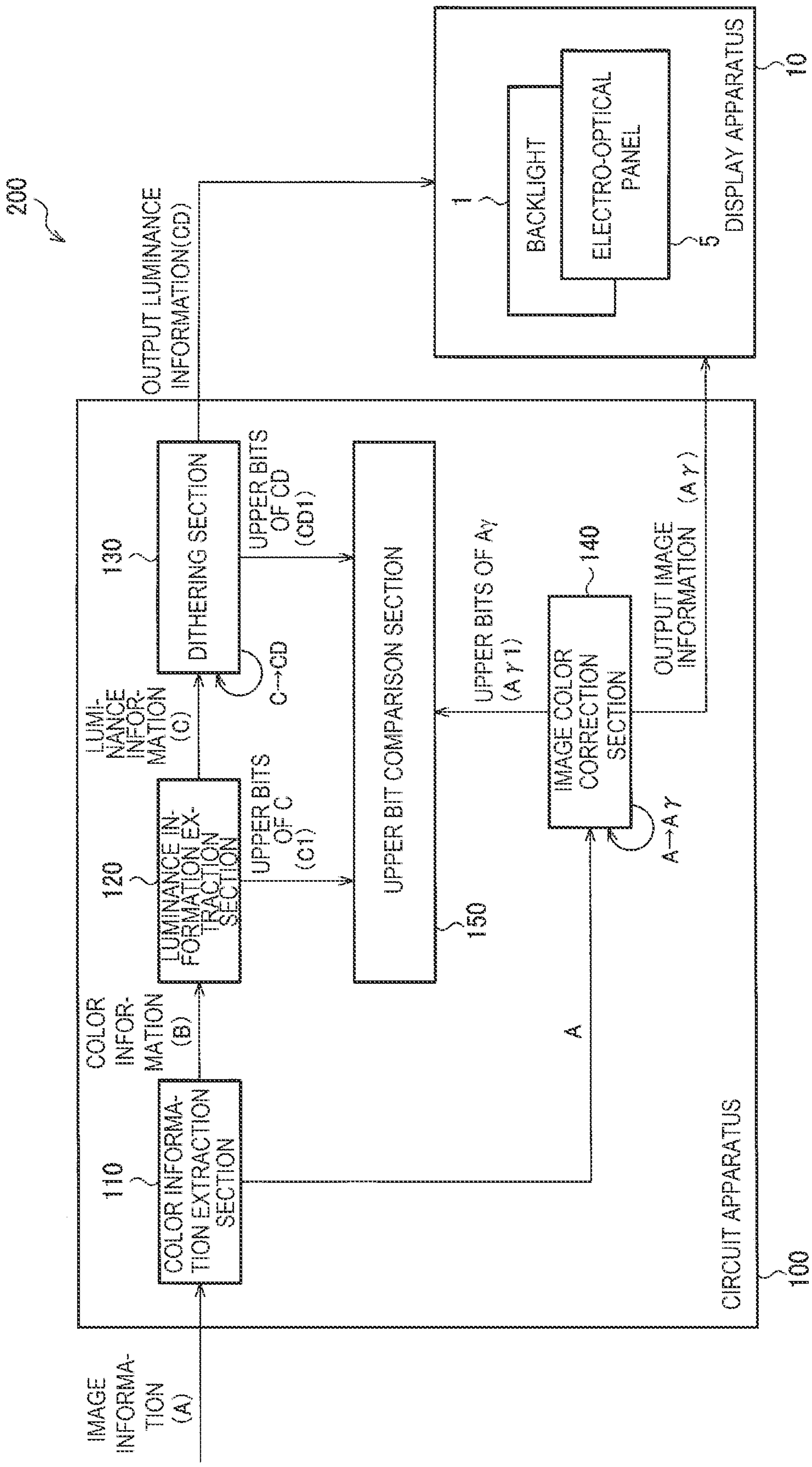
FIG. 1 describes an example of the configurations of a display control system and a circuit apparatus.

FIG. 1 shows an example of the configurations of a circuit apparatus 100 and a display system 200 according to the present embodiment. The display system 200 is a system that controls how a display apparatus 10 performs display operation and includes the circuit apparatus 100 and the display apparatus 10. The display apparatus 10 is, for example, a cluster display or a head-up display for automotive applications, but not limited to those for automotive applications. For example, the following description will be made with reference to display operation for automotive applications, but the method according to the present embodiment is not limited to those for automotive applications. In the following description, a head-up display is referred to as an HUD.

The display apparatus 10 includes a backlight 1 and an electro-optical panel 5. The backlight 1 is provided with a plurality of light sources. Specifically, the backlight 1 includes a plurality of light sources that are each achieved by an LED or any other component and are arranged in an array. The display apparatus 10 may include a light source driver that is not shown but drives the light sources of the backlight 1, a display driver that is not shown but drives the electro-optical panel 5, and other components. In variations that will be described later, the light source driver, which drives the light sources of the backlight 1, may be called a processing apparatus 3, the details of which will be described later. The display driver also includes a data driver that drives data lines of the electro-optical panel 5, a scan driver that drives scan lines of the electro-optical panel 5, a display controller, and other components. In the present embodiment, the light sources provided in the backlight 1 can be controlled with m-bit luminance information in the circuit apparatus 100, more specifically, a case where m=8 bits (0 to 255) is presented by way of example.

The circuit apparatus 100 receives image information from a predetermined device that is not shown in FIG. 1 and outputs output luminance information, output image information, and other pieces of information based on the image information to the display apparatus 10 by using a method described below. The image information in the present embodiment is assumed to be raster data formed of m bits for each of RGB colors. That is, the number of bits for each of the colors in the image information and the number of bits in the luminance information are assumed to be the same m bits. However, the description does not preclude a case where the image information may be expressed in other formats, such as the CMYK format. For example, when the display system 200 is used in an automotive application, the predetermined device carries out the processes of sensing a variety of pieces of information on the vehicle and forming image information based on the sensed data. The variety of types of information on the vehicle may include speed information, information on warning lights and the amount of remaining fuel, and other pieces of information on the vehicle being driven, but not limited thereto, and may also include, for example, information on sensed vehicles or passersby in front of the vehicle. In this case, the predetermined device can be achieved, for example, by an SoC (System on Chip) having a graphics function.

Each portion that constitutes the display system 200 according to the present embodiment thus transmits and receives a variety of data and updates frames at a predetermined frame rate to achieve an animated display on the display apparatus 10. Therefore, when the display system 200 is used, for example, in an automotive application, a user can grasp changes in the speed of the vehicle through video images on a meter of the vehicle. In the present embodiment, the order of generated frames may be expressed by N (N is integer greater than or equal to 2). Data for controlling the state in which the backlight 1 is turned on or off is also updated in correspondence with the frame update.

However, at least some of the portions that constitute the display system 200 may not, for example, accurately transmit and receive the data on the control of the luminance of the light sources of the backlight 1, which may cause an event in which the information on the control of the state in which the backlight 1 is turned on or off is not updated, so that the data before the update may remain being transmitted and received. In the present embodiment, the event described above is called an event in which "the backlight 1 is stuck" or the like. The event may prevent the user from viewing the image that should be normally viewed on the display apparatus 10. In the following description, "the backlight 1 is stuck" or the like is simply called "sticking". The present embodiment relates to a method for sensing the sticking.

It is assumed in the present embodiment that data transmitted to the electro-optical panel 5 be transmitted and received without any problems. In other words, it is assumed that there are no problems with the predetermined device described above, a color information extraction section 110, an image color correction section 140, an upper bit comparison section 150, the display driver that is not shown, and other sections, and that the values of upper bits of the output image information, which will be described later, are always correct.

The circuit apparatus 100 includes the color information extraction section 110, a luminance information extraction section 120, a dithering section 130, the image color correction section 140, and the upper bit comparison section 150. Although not shown in FIG. 1, the circuit apparatus 100 can further include other components, which will be described later in detail.

The circuit apparatus 100 can be achieved, for example, by a processor. For example, each process in the present embodiment can be achieved by a processor that operates based on a program or other information and a memory that stores the program or other information. The processor may, for example, be achieved by individual hardware components for the functions of the portions that constitute the display system 200, or a hardware component that integrally provides the functions of the portions. For example, the processor can include hardware, which can include at least one of a circuit that processes digital signals and a circuit that processes analog signals. For example, the processor can be formed of one or more circuit apparatuses or one or more circuit elements mounted on a circuit substrate. The processor may, for example, be a CPU (Central Processing Unit). Note that the processor is not limited to a CPU and can be a GPU (graphics processing unit), a DSP (digital signal processor), or any of a variety of other processors. The processor may instead be a hardware circuit formed of an ASIC. The processor may include an amplifier circuit, a filter circuit, and other circuits that process analog signals. The circuit apparatus 100 then reads and executes a sticking sensing program from the memory that is not shown in FIG. 1 to, for example, achieve the functions as the color information extraction section 110, the luminance information extraction section 120, the dithering section 130, the image color correction section 140, and the upper bit comparison section 150. The functions of the color information extraction section 110, the luminance information extraction section 120, the dithering section 130, the image color correction section 140, and the upper bit comparison section 150 will be described later in the description with reference to FIG. 2.

Figure 2:
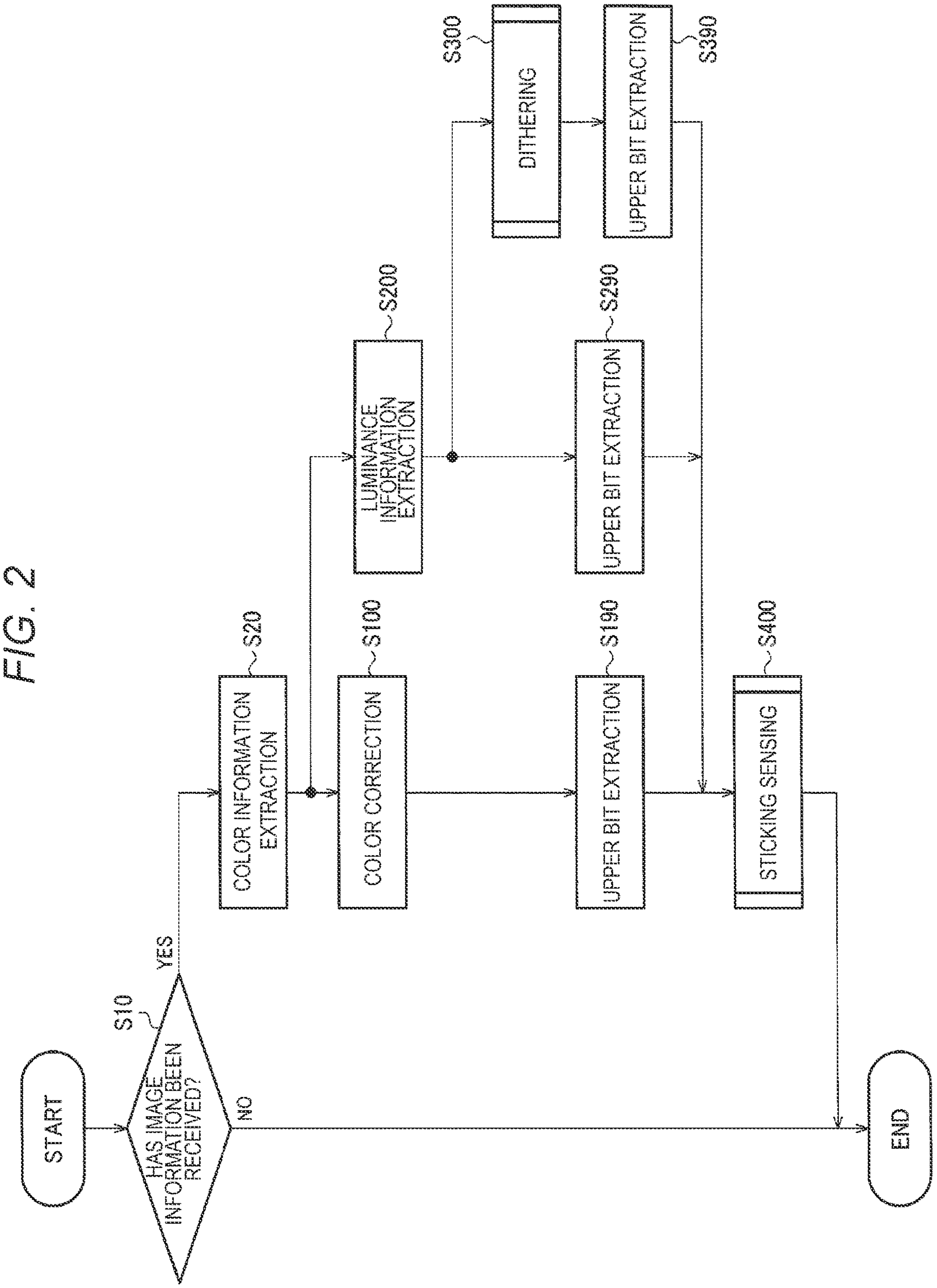
FIG. 2 is a flowchart for describing an example of processes carried out in the present embodiment.

Processes carried out in the present embodiment will be described with reference to the flowchart of FIG. 2. The procedure in FIG. 2 is performed in a predetermined cycle, for example, by timer interruption. The predetermined period is assumed to be shorter than the period based on the frame rate described above. The circuit apparatus 100 carries out the process of evaluating whether image information has been received (step S10). When the circuit apparatus 100 determines that no image information has been received (NO in step S10), the circuit apparatus 100 terminates the procedure. On the other hand, when the circuit apparatus 100 determines that image information has been received (YES in step S10), the circuit apparatus 100 performs color information extraction (step S20).

In the color information extraction (step S20), specifically, for example, the color information extraction section 110 extracts color information from the image information. For example, the color information extraction section 110 extracts R, G, and B grayscale values at a pixel located at predetermined coordinates in the image information received from the predetermined device, which is not shown in FIG. 1, and transmits the extracted grayscale values to the luminance information extraction section 120 and the image color correction section 140. The predetermined coordinates may be formed of a plurality of sets of predetermined coordinates, but it is assumed in the description for simplicity thereof that there is only one set of predetermined coordinates. In the following description, for example, the color information at a pixel where R, G, and B grayscale values are each 0 may be denoted, for example, as (R, G, B)=(0, 0, 0). The color information, the luminance information, the values of the upper bits, and other numerical values are hereinafter denoted by using the binary or decimal system as appropriate. Although not shown in the flowchart of FIG. 2, the color information extraction section 110 also carries out the process of transmitting the received image information as is to the image color correction section 140. In other words, the color information extraction section 110 transmits the R, G, and B grayscale values of all pixels contained in the image information to the image color correction section 140.

The predetermined coordinates can be set as appropriate in correspondence with the coordinates at which a predetermined image is disposed. However, for example, when the predetermined image is a uniform background image, any coordinates may be set as the predetermined coordinates. For example, when the method according to the present embodiment is applied to each area AR, which will be described later, the predetermined coordinates may be set for each area AR.

For example, when a predetermined instrument including the display system 200 is operated, the predetermined device, which is not shown in FIG. 1, generates an initial image that is an image in an initial state as the image information and transmits the generated image information to the circuit apparatus 100. In the present embodiment, the initial image is assumed to be a dark uniform background image, for example, (R, G, B)=(0, 0, 0) is satisfied at all pixels that constitute the initial image. Thereafter, when the user desires to cause the predetermined instrument to notify new information at a predetermined timing, the predetermined device transmits a predetermined image corresponding to the new information to the circuit apparatus 100 as new image information. The predetermined image is displayed on the display apparatus 10 as a bright image clearly distinguishable from the initial image. Specifically, for example, at least one of the R, G, and B grayscale values of the predetermined image is so set that the value of the upper bits is greater than or equal to 1. The "value of the upper bits is greater than or equal to 1" refers, for example, to the state in which the upper bits are not 0000 when the number of upper bits is 4. The "value of the upper bits is 0", which will be described later refers, for example, to the state in which the upper bits are 0000 when the number of upper bits is 4. In the present embodiment, for convenience, a color expressed by upper bits having a value greater than or equal to 1 is called a "bright color", and a color expressed by upper bits having a value equal to 0 is called a "dark color". The upper bits will be described later in detail. To simplify the description, the predetermined image used herein is a uniform blue background image, and the R and G grayscale values of the predetermined image are 0. A case where the predetermined image is formed of different images on an area basis and a case where at least two of the R, G and B grayscale values of the predetermined image are not 0 will be described later. In the following figures, the image information may be denoted as A.

For example, when the blue grayscale value of the predetermined image is 11111010 (=250), the color information extraction section 110 transmits 11111010 (=250) as the color information to the luminance information extraction section 120. When the image information is the image information on the initial image, the color information extraction section 110 transmits 00000000 (=0) as the color information to the luminance information extraction section 120. In the following figures, the color information may be denoted as C.

After performing the color information extraction (step S20), the circuit apparatus 100 performs color correction (step S100) and luminance information extraction (step S200), and after performing the color correction (step S100), the circuit apparatus 100 performs upper bit extraction (step S190). That is, the memory that is not shown in FIG. 1 stores in advance coefficient information necessary for the color correction (step S100). For example, when the blue color of the predetermined image displayed on the display apparatus 10 seems to be insufficient, the coefficient information stored in the memory that is not shown compensates for the insufficient blue color. The same holds true for the other colors. In the image color correction (step S100), the image color correction section 140 selects the coefficient information corresponding to the received color information and multiplies the color information by the coefficient information for each pixel that constitutes the image information. When the image color correction section 140 receives the image information based on the initial image, the image color correction section 140 may omit step S100 and use the image information based on the initial image as is as the output image information.

It is assumed in the present embodiment that the output image information is the image information after the image color correction section 140 performs the color correction (step S100). In the following description and illustration, the output image information may be denoted as Aγ.

The image color correction section 140 then transmits the output image information to the display apparatus 10, and the display driver, which is not shown, display an image based on the output image information on the electro-optical panel 5. The image color correction section 140 thus corrects the color of the image information and outputs the corrected image information as the output image information to the display apparatus 10.

In the upper bit extraction (step S190), specifically, for example, the image color correction section 140 carries out the processes of extracting the color information at the predetermined coordinates described above in the output image information, extracting the values of the upper bits of the color information, and transmitting the values of the upper bits to the upper bit comparison section 150. In the following description, the upper bits may be denoted as Aγ1.

The color information at the predetermined coordinates in the output image information in which the color has been corrected by the color correction (step S100) may differ from the color information at the predetermined coordinates in the initial image information, which does not matter. The reason for this is that when the image information is based on the "bright color", the output image information after the color correction (step S100) still has a "bright color". That is, performing the color correction (step S100) on image information in which the value of the upper bits is greater than or equal to 1 does not change the fact that the value of the upper bits is still greater than 1, and does not affect the result of sticking sensing (step S400), which will be described later.

Specifically, for example, when the blue grayscale value at the predetermined coordinates in the output predetermined image as a result of the color correction (step S100) performed on the predetermined image ranges from 240 (11110000) to 255 (11111111), the image color correction section 140 transmits 1111, which represent the upper 4 bits as the upper bits, as Aγ1. The 4 bits used herein are derived from m/2 bits when m=8 bits, and will be described later in detail. Similarly, when the grayscale scale value ranges from 224 to 239, 1110, which represent the upper 4 bits, is transmitted as Aγ1. That is, when the color correction (step S100) is performed on the predetermined image having a blue grayscale value of 250, the value in the color information on the color of the output predetermined image is no longer 250, and the value of Aγ1 may vary depending on the result of the color correction, which does not matter because it is not expected that the value of Aγ1 does not fall within the range from 16 to 255. It is, however, desirable that the grayscale value of the predetermined image is a highest possible value.

In the luminance information extraction (step S200), for example, the luminance information extraction section 120 extracts the luminance information for controlling the luminance of the backlight 1 based on the color information. More specifically, for example, when the luminance information extraction section 120 receives 11111010 as the color information from the color information extraction section 110 as described above, the luminance information extraction section 120 carries out the process of setting the luminance information on the luminance of the light sources of the backlight 1 at 11111010 and the process of transmitting the set luminance information to the dithering section 130. When the color information transmitted to the image color correction section 140 is the color information based on the initial image, that is, when the color information is 00000000, the luminance information extraction section 120 carries out the process of setting the luminance information at 00000000. That is, when image information formed only of the initial image is transmitted, the user is practically looking at the electro-optical panel 5 with the backlight 1 turned off.

After performing the luminance information extraction (step S200), the circuit apparatus 100 performs the upper bit extraction (step S290) and dithering (step S300). The dithering (step S300) will be described later in detail with reference to FIG. 3. In the upper bit extraction (step S290), for example, the luminance information extraction section 120 carries out the processes of extracting the upper bits of the luminance information set in step S200 and transmitting the extracted upper bits to the upper bit comparison section 150. More specifically, since the luminance information has been set at 11111010, the luminance information extraction section 120 carries out the process of transmitting 1111, which represent the upper 4 bits as the upper bits, to the upper bit comparison section 150. The situation in which the 4 bits in the description are derived from m/2 bits when m=8 bits is the same as the situation in step S190. In the following description, the values of the upper bits may be denoted as C1. In the present embodiment, for convenience, light based on luminance information in which the value of the upper bits is greater than or equal to 1 is called "bright light", and light based on luminance information in which the value of the upper bits is 0 is called "dark light".

Figure 3:
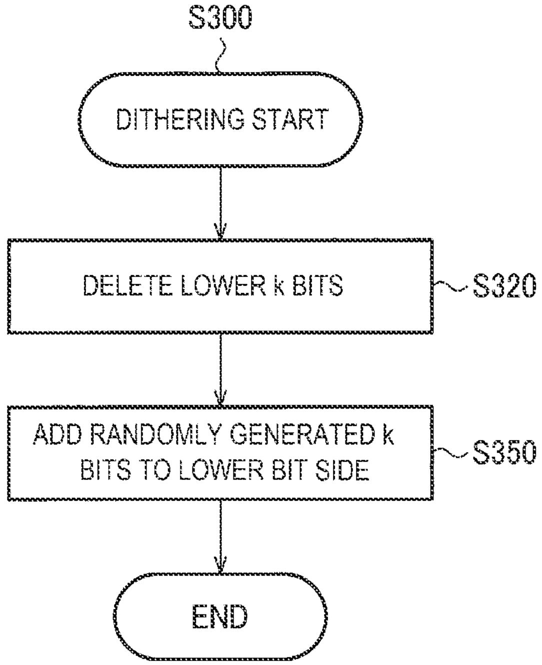
FIG. 3 is a flowchart for describing an example of dithering.

FIG. 3 is a flowchart for describing the dithering (step S300) in more detail. For example, the dithering section 130 carries out the processes of deleting k bits from the lower bits (step S320) and adding randomly generated k bits to the lower bits (step S350). The constant k is the number of bits for dithering, is an integer greater than or equal to 1, and is desirably small enough not to affect the result of the sticking sensing (step S400), which will be described later. For example, when the value of k is increased, there is a possibility of a change from the "bright light" to the "dark light" or from the "dark light" to the "bright light" due to the dithering (step S300), but in the present embodiment, k is assumed to be a numerical value that falls within a range within which there is no possibility of such a change. The constant k may be a value set in advance, or the value of the set k may be changed after the display system 200 is activated.

A method for generating random values is not limited to a specific method as long as the values of the k bits in the (N−1)-th frame differ from the values of the k bits in the N-th frame, and may be a method for generating random numbers or a method for repeatedly generating a fixed value. A method for regularly generating 00, 01, 10, and 11 with k=2 is presented below by way of example, but not limited thereto.

Specifically, for example, when k=2, the dithering section 130 deletes in step S320 the lower two bits (=10) of 11111010 received from the luminance information extraction section 120 to set 111110.

Thereafter, in step S350, the dithering section 130 periodically generates 11111000, 11111001, 11111010, and 11111011, for example, by using the method described above. Although not shown in FIG. 3, the dithering section 130 outputs the values generated in step S350 to the display apparatus 10 as the output luminance information. In the following description, the output luminance information may be denoted as CD. In the present embodiment, the backlight 1 of the display apparatus 10 includes a plurality of light sources, and since the initial and predetermined images are uniform background images, it is assumed that one piece of output luminance information can control all the light sources of the backlight 1. The case where image information varies for each of the areas AR will be described later. The dithering section 130 thus adds bits for dithering to the lower bit side of the luminance information and outputs the luminance information after the addition to the display apparatus 10 as the output luminance information.

When the dithering section 130 receives the luminance information based on the initial image, that is, 00000000, then 00000000, 00000001, 00000010, and 00000011 are periodically generated in steps S320 and S350, and transmitted as the output luminance information to the display apparatus 10. In this case, since only the grayscale values ranging from 0 to 3 with respect to the largest grayscale value 255 are output to the display apparatus 10, the state in which the backlight 1 is not turned on in effect continues.

After performing the dithering (step S300), the circuit apparatus 100 performs the upper bit extraction (step S390). For example, when the upper bits extracted in steps S190 and S290 are 4 bits, the dithering section 130 carries out the process of transmitting 1111, which represent the values of the upper 4 bits of the output luminance information, to the upper bit comparison section 150 accordingly. In the following description, the values of the upper bits may be denoted as CD1.

Figure 4:
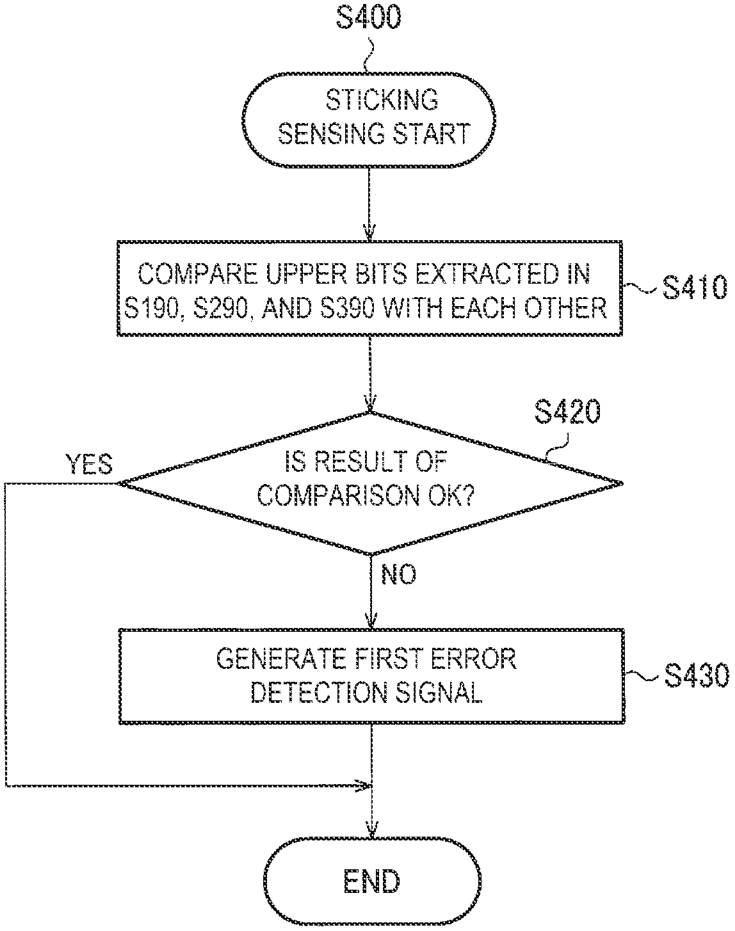
FIG. 4 is a flowchart for describing an example of sticking sensing.

The circuit apparatus 100 then performs the sticking sensing (step S400). FIG. 4 is a flowchart for describing the sticking sensing (step S400) in more detail. The circuit apparatus 100 carries out the process of comparing the upper bits extracted in steps S190, S290, and S390 with each other (step S410). That is, the upper bit comparison section 150 compares the upper bits of the luminance information (C1), the upper bits of the output luminance information (CD1), and the upper bits of the output image information (Aγ1) with each other. More specifically, the result of the comparison is determined as OK (no problem) when the values of C1, CD1, and Aγ1 are all greater than or equal to 1, or when the values of C1, CD1, and Aγ1 are all 0, otherwise the result of the comparison is determined as NG (problematic).

The circuit apparatus 100 then carries out the process of evaluating whether the result of the comparison is problematic (step S420), and when the result of the comparison is determined to be OK (YES in step S420), the circuit apparatus 100 terminates the procedure.

For example, when the processes in FIG. 2 are carried out at a first timing at which only the initial image is displayed, the color information at the pixels that constitute the initial image is (R, G, B)=(0, 0, 0), so that the values of C1, CD1, and Aγ1 are all 0. On the other hand, when the processes in FIG. 2 are carried out at a second timing at which the predetermined image is displayed in the example described above, the values of C1, CD1, and Aγ1 are greater than or equal to 1. That is, the upper bit comparison section 150 determines the result of the evaluation in step S420 to be YES when the values of C1, CD1, and Aγ1 are all greater than or equal to 1 at the second timing. The circuit apparatus 100 thus determines that no sticking has occurred.

As described above, the circuit apparatus 100 according to the present embodiment controls the display apparatus 10 including the backlight 1 and the electro-optical panel 5, and includes the color information extraction section 110, the luminance information extraction section 120, the dithering section 130, the image color correction section 140, and the upper bit comparison section 150. The color information extraction section 110 extracts the color information from the image information. The luminance information extraction section 120 extracts the luminance information for controlling the luminance of the backlight 1 based on the color information. The dithering section 130 adds bits for dithering to the lower bit side of the luminance information and outputs the luminance information after the addition to the display apparatus 10 as the output luminance information. The image color correction section 140 corrects the color of the image information and outputs the corrected image information as the output image information to the display apparatus 10. The upper bit comparison section 150 compares the upper bits of the luminance information, the upper bits of the output luminance information, and the upper bits of the output image information with each other.

The circuit apparatus 100 according to the present embodiment, which controls the display apparatus 10 including the backlight 1 and the electro-optical panel 5, can thus be used with the display apparatus 10. The circuit apparatus 100 further includes the color information extraction section 110, the luminance information extraction section 120, the dithering section 130, and the image color correction section 140, and can therefore extract the upper bits of the luminance information, the upper bits of the output luminance information, and the upper bits of the output image information. The circuit apparatus 100 still further includes the upper bit comparison section 150 and can therefore compare the upper bits of the luminance information, the upper bits of the output luminance information, and the upper bits of the output image information with each other. Whether the sticking has occurred can therefore be detected at an appropriate timing.

Specifically, assume, for example, that the luminance information extraction section 120 malfunctions at the first timing described above, so that the luminance information extraction section 120 does not update the luminance information and keeps transmitting the luminance information having the same value. In this case, the dithering section 130 transmits the output luminance information carrying the grayscale values ranging from 0 to 3 to the display apparatus 10, so that the situation in which the light sources of the backlight 1 emit practically no light continues after the first timing, as described above. Therefore, even when the image information based on the predetermined image is transmitted from the predetermined device at the second timing, the user cannot view the predetermined image. In this regard, applying the method according to the present embodiment and executing step S400 at the second timing allows the value of Aγ1 to be greater than or equal to 1 and the values of C1 and CD1 to be 0. The upper bit comparison section 150 can thus determine that the result of the evaluation in step S420 is NO, whereby the circuit apparatus 100 can carry out the process of determining that the sticking has occurred at the second timing.

Assume, for example, that the dithering section 130 malfunctions at the first timing, so that the dithering section 130 keeps transmitting output luminance information dithered for the same luminance information value. Similarly, also in this case, even when the image information based on the predetermined image is transmitted from the predetermined device at the second timing, the user cannot view the predetermined image. In this regard, applying the method according to the present embodiment and executing step S400 at the second timing allows the values of Aγ1 and C1 to be greater than or equal to 1 and the value of CD1 to be 0. The upper bit comparison section 150 thus determines the result of the evaluation in step S420 to be NO, whereby the circuit apparatus 100 can carry out the process of determining that the sticking has occurred at the second timing.

The method according to the present embodiment may instead be achieved as a display system 200. That is, the display system 200 according to the present embodiment includes the circuit apparatus 100 and the display apparatus 10 described above. The same effects as those described above can thus be provided.

The method according to the present embodiment is not limited to the method described above. For example, the upper bit comparison section 150 may carry out the process of generating a first error detection signal (step S430) after determining the result of the evaluation in step S420 to be NO, as shown in FIG. 4. The first error detection signal is specifically, for example, but not limited to, a signal for generating a predetermined audio alarm, a signal for turning on a predetermined lamp, or a reset signal, and any of a variety of other methods can be employed. As described above, in the circuit apparatus 100 according to the present embodiment, the upper bit comparison section 150 outputs the first error detection signal when the results of comparing the upper bits of the luminance information, the upper bits of the output luminance information, and the upper bits of the output image information show that they disagree with one another. The user can thus quickly recognize that the sticking has occurred. For example, when the sticking occurs at the second timing described above, the user who is looking at the display apparatus 10 can only recognize that the initial image continues to be displayed. In this regard, applying the method according to the present embodiment causes the first error signal to be output at the second timing, whereby the user can recognize that the sticking has occurred at the second timing. The user can thus quickly recognize that the sticking has occurred and take appropriate measures. Examples of the appropriate measures may include reactivating the display system 200, stopping the entire apparatus including the display system 200, and checking each piece of hardware and software that constitute the display system 200.

Figure 5:
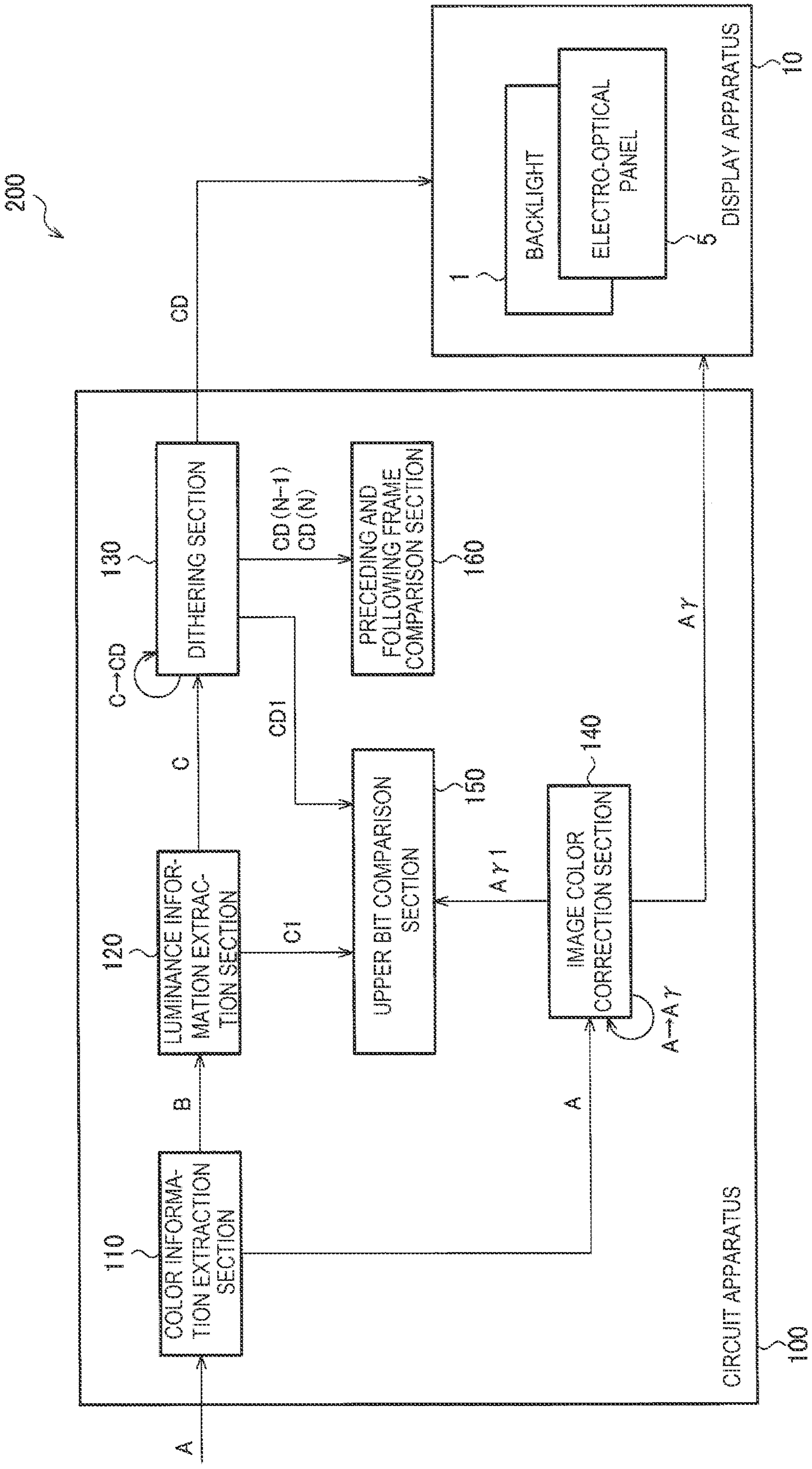
FIG. 5 describes another example of the configurations of the display control system and the circuit apparatus.

The circuit apparatus 100 and the display system 200 according to the present embodiment may, for example, be configured as shown in FIG. 5. FIG. 5 differs from FIG. 1 in that the configuration shown in FIG. 5 includes a preceding and following frame comparison section 160. That is, the circuit apparatus 100 according to the present embodiment further includes the preceding and following frame comparison section 160, which compares the output luminance information for the (N−1)-th frame with the output luminance information for the N-the frame, where N is an integer greater than or equal to 2. Whether the sticking has occurred can thus grasped on a frame update timing basis.

Figure 6:
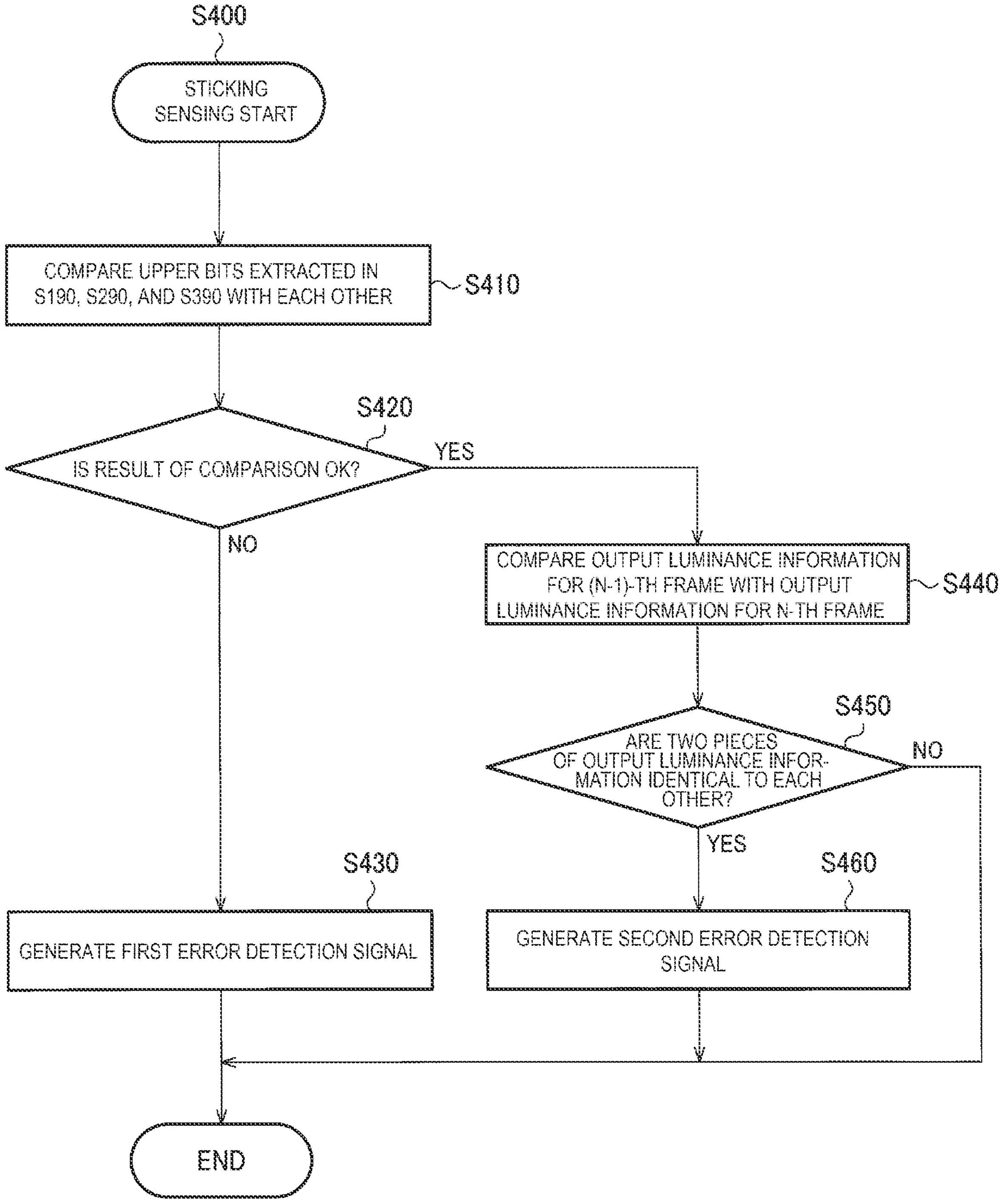
FIG. 6 is a flowchart for describing another example of the sticking sensing.

When the circuit apparatus 100 and the display system 200 are configured as in the example shown in FIG. 5, the sticking sensing (step S400) may, for example, be performed by carrying out the processes shown in FIG. 6. FIG. 6 differs from FIG. 4 in that FIG. 6 further includes steps S440, S450, and S460. In the following description, the configurations and processes that duplicate those in FIGS. 1 and 4 will be omitted as appropriate.

When the circuit apparatus 100 determines the result of the evaluation in step S420 described above to be YES, the circuit apparatus 100 carries out the process of comparing the output luminance information for the (N−1)-th frame with the output luminance information for the N-th frame (step S440). In the following description and illustration, the output luminance information for the (N−1)-th frame may be denoted as CD(N−1), and the output luminance information for the N-th frame may be denoted as CD(N).

For example, the preceding and following frame comparison section 160 includes a buffer that stores data on CD(N−1) and data on CD(N), and after receiving the data on CD(N−1) and the data on CD(N) from the dithering section 130, compares the data on CD (N−1) with the data on CD (N). Thereafter, when the circuit apparatus 100 determines that the data on CD(N−1) is identical to the data on CD(N) (YES in step S450), the circuit apparatus 100 carries out the process of generating a second error detection signal (step S460) and terminates the procedure. The second error detection signal is an error detection signal different from the first error detection signal described above. On the other hand, when the circuit apparatus 100 determines that the data on CD(N−1) is not identical to the data on CD(N) (NO in step S450), the circuit apparatus 100 terminates the procedure.

When the operation in step S350 described above is functioning properly, the value of the output luminance information output from the dithering section 130 on a frame basis will not be continuously the same, as described above. That is, when the result of the evaluation in step S440 is determined to be YES, the dithering is not functioning properly, indicating that the dithering section 130 is malfunctioning. As described above, in the circuit apparatus 100 according to the present embodiment, the preceding and following frame comparison section 160 outputs the second error detection signal when the output luminance information for the (N−1)-th frame is identical to the output luminance information for the N-th frame. The user can thus quickly grasp that the dithering is not functioning properly. The user can thus quickly grasp that the sticking has occurred in the circuit apparatus 100 and display system 200.

Comparing the case where the functions of the display system 200 each work properly with the case where only the function of the dithering section 130 out of the functions of the display system 200 is not working shows that the only difference that occurs is that the same CD value is transmitted to the display apparatus 10, so that substantially desired brightness continues to be displayed. When the processor performing the function of the dithering section 130 is malfunctioning, however, it is desirable to quickly take appropriate measures because the malfunction suggests that other functions may also not work separately.

Assume, for example, that the predetermined image is displayed at the second timing and the user recognizes the situation in which the predetermined image is continuously displayed, but the imaged displayed on the display apparatus 10 has become dark at a third timing after the second timing. In this case, which means that the displayed image has not been switched to the initial image but the backlight 1 has no longer emitted light, it thus can be determined that the sticking has occurred. In this case, for example, when both the first and second error detection signals described above are not output, the luminance information extraction section 120 and the dithering section 130 of the circuit apparatus 100 are functioning properly, so that the user can determine that a problem has occurred not in the circuit apparatus 100 but in the display apparatus 10. As described above, applying the method according to the present embodiment allows quick determination of whether the defect has occurred in the circuit apparatus 100 or the display apparatus 10 when the sticking occurs.

The above description is based on the assumption that, for example, the R and G grayscale values are 0 as the color information on the color of the predetermined image, and the method according to the present embodiment is also applicable to a case where at least two of the R, G, and B grayscale values are not zero as the color information on the color of the predetermined image. In this case, step S200 may be the process of extracting the grayscale value of a color component having the largest grayscale value out of the entire color components as the color information. For example, when color information of (R, G, B)=(250, 10, 10) is received as the image information formed of the predetermined image from the color information extraction section 110, the largest grayscale value is 250, so that the luminance information may be set at 11111010 (=250). As described above, in the circuit apparatus 100 according to the present embodiment, the luminance information extraction section 120 extracts luminance information based on the color component having the highest luminance out of the plurality of color components in the color information. The luminance information for controlling the light sources of the display apparatus 10, which displays image information for displaying colors including a plurality of color components, can thus be appropriately extracted.

Step S190 in this case may be the process of extracting upper bits corresponding to the grayscale value of the color component having the largest grayscale value among the color components at the predetermined coordinates in the output image information as the result of the color correction (step S100) performed on the image information. Also in this case, for example, when the color of the color component having the largest grayscale value in the image information is a "bright color," the color of the color component having the largest grayscale value in the output image information is also considered to be a "bright color," so that the value of the upper bits output to the upper bit comparison section 150 is still greater than or equal to 1.

As described above, in the circuit apparatus 100 according to the present embodiment, the image color correction section 140 outputs the upper bits of the output image information to the upper bit comparison section 150 based on the color component having the largest value among the plurality of color components in the output image information. The upper bits of the output image information containing a plurality of color components can thus be appropriately extracted and transmitted to the upper bit comparison section 150.

Figure 7:
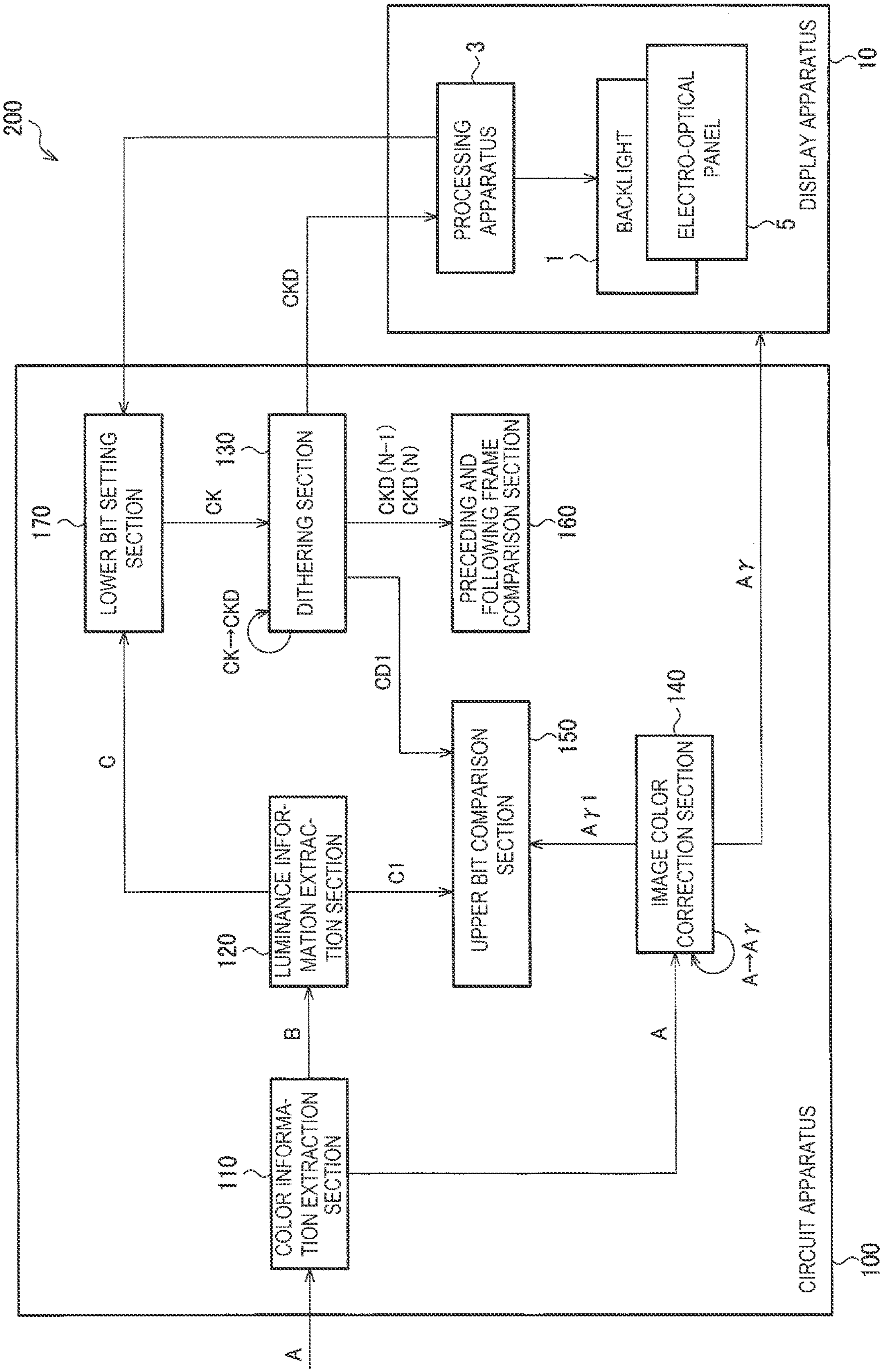
FIG. 7 describes another example of the configurations of the display control system and the circuit apparatus.

The above description is an example applicable to a case where the number of bits processed by the processing apparatus 3, which is a light source driver that controls the backlight 1, is equal to the number of bits of output luminance information, but the method according to the present embodiment is not necessarily applied thereto. For example, configuring the circuit apparatus 100 and the display system 200 as shown in FIG. 7 allows the method according to the present embodiment to be applicable to even a case where the number of bits processed by the processing apparatus 3, which controls the backlight 1, is greater than the number of bits of the output luminance information. The number of bits processed by the processing apparatus 3 is hereinafter denoted as q as appropriate. FIG. 7 differs from FIG. 3 in that the configuration shown in FIG. 7 further includes a lower bit setting section 170 and FIG. 7 shows the processing apparatus 3. The lower bit setting section 170 can be achieved by the processor described above. The lower bit setting section 170 may be further provided in the circuit apparatus 100 shown in FIG. 1. The number of bits processed by the processing apparatus 3 is determined as appropriate based, for example, on the number of bits that a CPU that constitutes the processing apparatus 3 can process in one clock, and the number of bits per unit in the communication between the processing apparatus 3 and the circuit apparatus 100.

Figure 8:
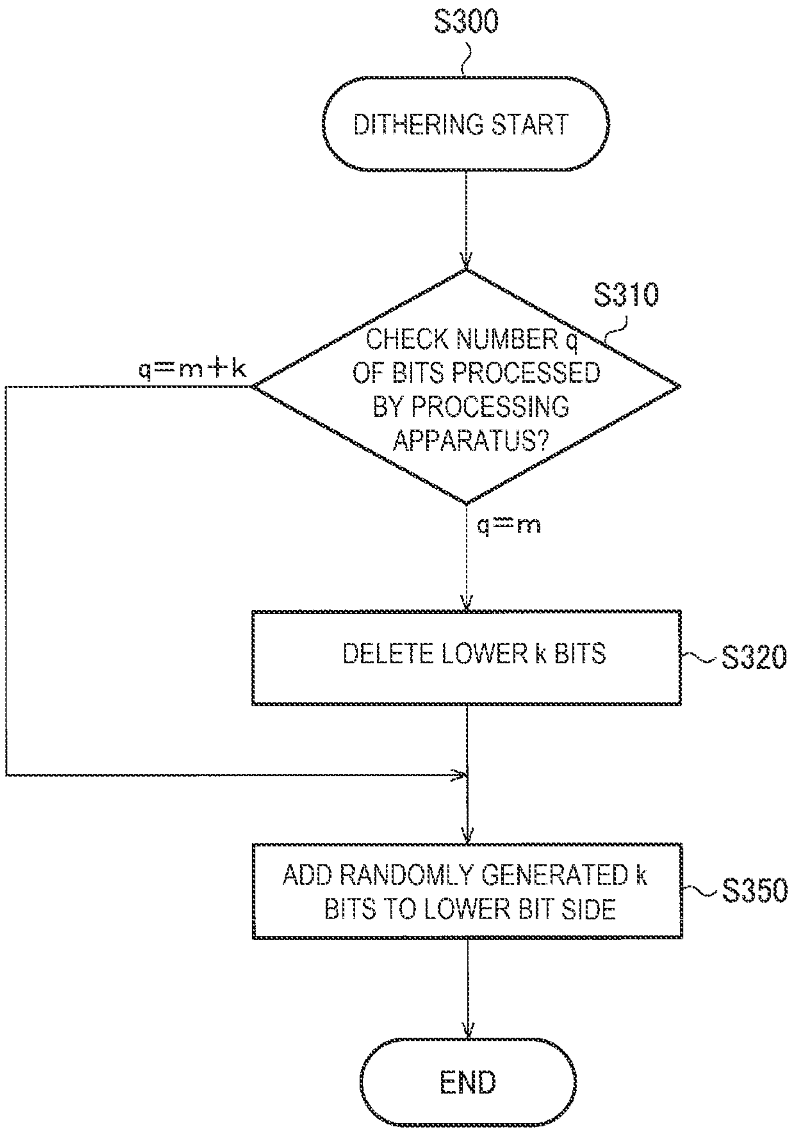
FIG. 8 is a flowchart for describing another example of the dithering.

In the exemplary configuration in FIG. 7, the dithering (step S300) in FIG. 3 may be performed by carrying out the processes shown in FIG. 8. The circuit apparatus 100 carries out the process of checking the number of bits processed by the processing apparatus 3 (step S310). Specifically, for example, the circuit apparatus 100 includes an interface that is not shown, and the lower bit setting section 170 receives, via the interface, information on the number of bits handled by the processing apparatus 3 from the processing apparatus 3. When the interface receives, for example, data containing a packet "00" from the processing apparatus 3, the interface analyzes the data, recognizes that the number of bits processed by the processing apparatus 3 is 8, and transmits information on the number of bits to the lower bit setting section 170. Similarly, when the number of bits processed by the processing apparatus 3 is 10, the packet is set at "01"; when the number of bits processed by the processing apparatus 3 is 12, the packet is set at "10"; when the number of bits processed by the processing apparatus 3 is 16, the packet is set at "11"; and so on. The lower bit setting section 170 then carries out the process of comparing the number of bits (q) handled by the processing apparatus 3 with the number of bits (m) of the luminance information transmitted from the luminance information extraction section 120.

Thereafter, for example, when the number of bits (q) processed by the processing apparatus 3 is equal to the number of bits of the luminance information (q=m), the circuit apparatus 100 executes step S320. Step S320 in FIG. 8, however, differs from step S320 in FIG. 3 in terms of points below. Specifically, for example, when the number of bits processed by the processing apparatus 3 and the number of bits of the luminance information are 8, the lower bit setting section 170 carries out the processes of setting the number of bits k for dithering at a desired number, deleting the lower k bits from the grayscale values of the luminance information, and transmitting the luminance information after the deletion to the dithering section 130. In FIG. 7, the luminance information after the deletion is denoted as CK. When q=m, the value indicated by CK is the value as the result of the deletion of the lower k bits from the value of C.

The dithering section 130 then executes step S350 and terminates the procedure. In FIG. 7, the output luminance information to which the bits for dithering has been added is denoted as CKD. Step S350 in FIG. 8, when compared with step S350 in FIG. 3, has a common process content and process executer. On the other hand, step S320 in FIG. 8 differs from step S320 in FIG. 3 in terms of process executer, as described above. As described above, in the circuit apparatus 100 according to the present embodiment, when the number of bits of the luminance information is m (m is integer greater than or equal to 2) and the number of bits for dithering is k (k is integer greater than or equal to 1), and when the number of bits processed by the processing apparatus 3 is m, the lower bit setting section 170 outputs the luminance information from which the lower k bits have been deleted to the dithering section 130. Luminance information formed of an appropriate amount of information can thus be transmitted to the dithering section 130 when the number of bits processed by the processing apparatus 3 is equal to the number of bits of the luminance information.

When it is considered reasonable that the number of bits processed by the processing apparatus 3 (q) is the sum of the number of bits of luminance information (m) and the number of bits for dithering (k) (q=m+k), the circuit apparatus 100 executes step S350 without executing step S320. Specifically, assume, for example, that q=10 and m=8. In this case, when k=2, q=m+k is satisfied. When the luminance information is formed of 8 bits, the lower bit setting section 170 determines that q=m+k is satisfied because setting the number of bits for dithering at 2 is reasonable. A case where q=m+k is satisfied and k does not fall within the reasonable range will be described later. The lower bit setting section 170 then carries out the process of transmitting the luminance information transmitted from the luminance information extraction section 120 as is to the dithering section 130. When q=m+k is satisfied, the value indicated by CK is equal to the value of C. As described above, in the circuit apparatus 100 according to the present embodiment, when the number of bits of the luminance information is m (m is integer greater than or equal to 2) and the number of bits for dithering is k (k is integer greater than or equal to 1), and when the number of bits processed by the processing apparatus 3 is m+k, the lower bit setting section 170 outputs the luminance information to the dithering section 130 without deleting the lower bits. Luminance information formed of an appropriate amount of information can thus be transmitted to the dithering section 130 when the number of bits processed by the processing apparatus 3 is handled as the sum of the number of bits of the luminance information and the number of bits for dithering.

For example, when the luminance information received by the dithering section 130 is 11111010, 10-bit values, 1111101000, 1111101001, 1111101010, and 1111101011, are periodically generated in step S350 as the output image information indicated by CKD. The dithering section 130 then transmits the 10-bit output luminance information to the processing apparatus 3. As described above, the circuit apparatus 100 according to the present embodiment further includes the lower bit setting section 170. The lower bit setting section 170 carries out the process of setting the lower bits of the luminance information from the luminance information extraction section 120 in accordance with the number of bits processed by the processing apparatus 3, which controls the backlight 1 based on the output luminance information, and outputs the set luminance information to the dithering section 130. The sticking can thus be quickly detected when the number of bits processed by the processing apparatus 3 differs from the number of bits of the luminance information.

The number of upper bits extracted by the subsequent upper bit extraction (step S390) remains the same as the number of upper bits extracted in steps S190 and S290, that is, 4, as described above, so that 1111 is transmitted as the upper 4 bits. In other words, the upper bits transmitted from the dithering section 130 to the upper bit comparison section 150 in the example in FIG. 7 are the values indicated by CD1 as in FIGS. 1 and 3.

Figure 9:
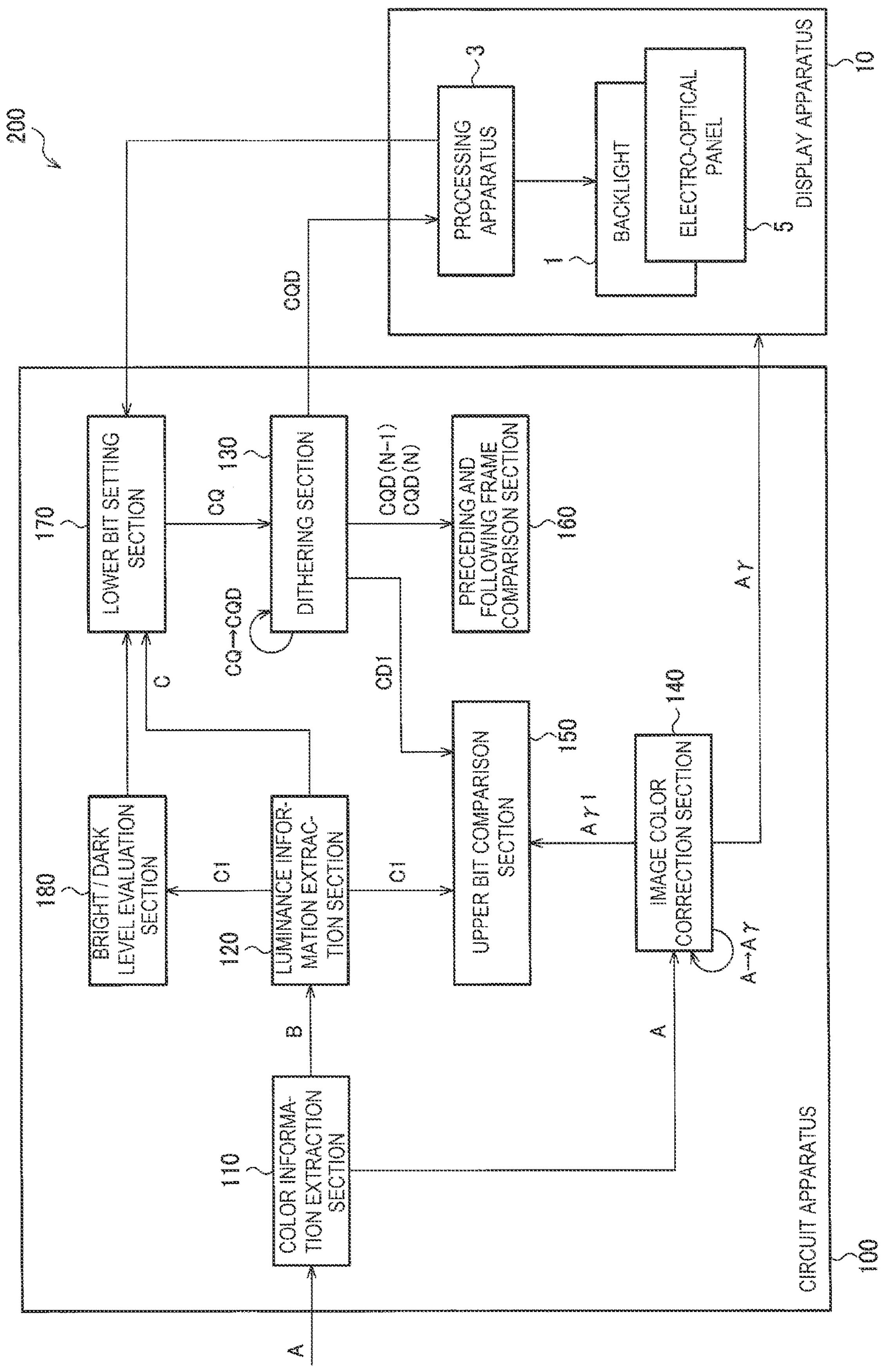
FIG. 9 describes another example of the configurations of the display control system and the circuit apparatus.
Figure 10:
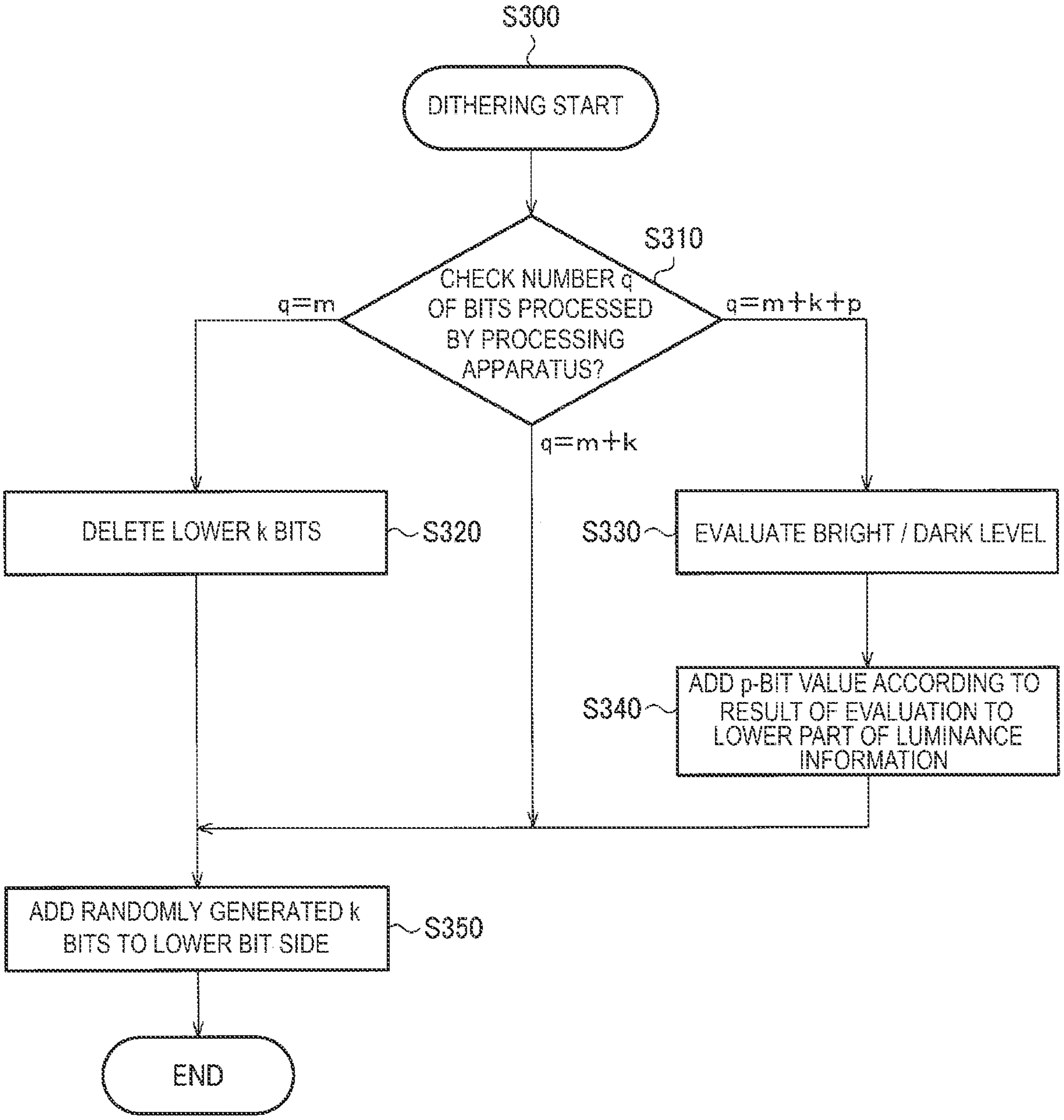
FIG. 10 is a flowchart for describing another example of the dithering.

The circuit apparatus 100 and display system 200 according to the present embodiment may, for example, be configured as shown in FIG. 9. FIG. 9 differs from FIG. 7 in that the circuit apparatus 100 further includes a bright/dark level evaluation section 180. When the circuit apparatus 100 and display system 200 are configured as shown by way of example in FIG. 9, the dithering (step S300) may, for example, be performed by carrying out the processes shown in FIG. 10. FIG. 10 differs from FIG. 8 in that the process in step S310 bifurcates not only into the process in S320 but into the processes in steps S330 and S340. In the description with reference to FIGS. 9 and 10, the portions that duplicate those in FIGS. 1 to 8 will be omitted as appropriate.

In step S310, when q cannot be expressed by q=m+k, but can be expressed by q=m+k+p (where p is integer greater than or equal to 1), the circuit apparatus 100 carries out the process of evaluating the bright/dark level (step S330) and the process of adding a p-bit value to the lower part of the luminance information in accordance with the result of the evaluation (step S340), and then carries out the step S350 described above. Specifically, for example, when q=12 and m=8, then k=4 is employed to represent q by q=m+k. However, 4 bits as the number of bits for dithering are too large with respect to the luminance information formed of 8 bits, and are therefore not appropriate. It is therefore determined that q is reasonably expressed, for example, by q=m+k+p with k and p each set at 2.

The bright/dark level evaluation (step S330) evaluates whether the light based on the luminance information is the "bright light" or the "dark light. More specifically, the bright/dark level evaluation section 180 receives the upper m/2 bits of the luminance information, that is, the value of C1 described above in FIG. 1 from the luminance information extraction section, evaluates whether the value of C1 is greater than or equal to 1, and transmits the result to the lower bit setting section 170.

Figure 11:
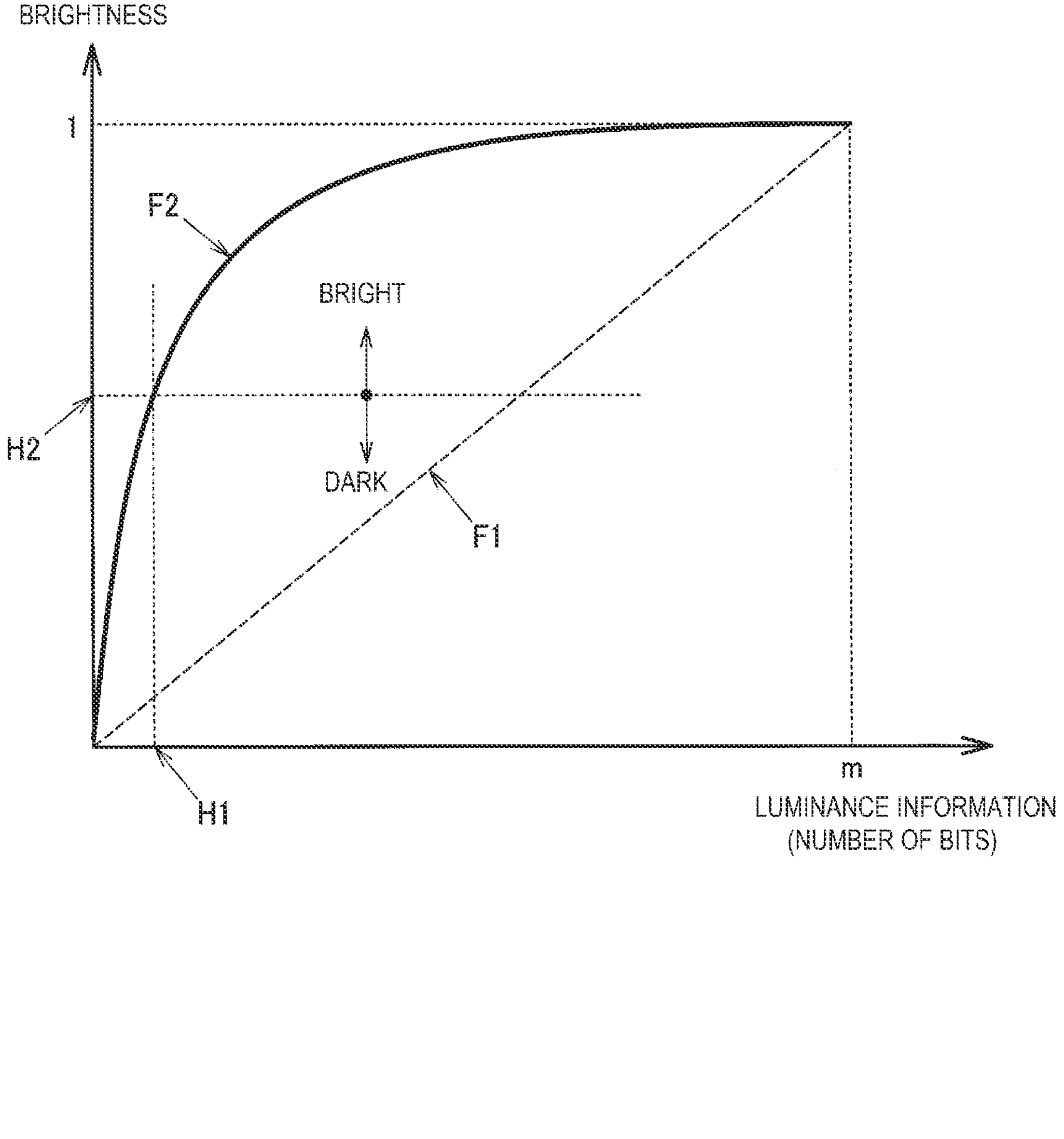
FIG. 11 describes the relationship between brightness and luminance information.

The mechanism by which the bright/dark level can be evaluated from the upper m/2 bits will now be described with reference to the graph in FIG. 11. When normalized brightness is expressed along the vertical axis, and the luminance information is expressed along the horizontal axis, the brightness of the light output from the light sources is proportional to the grayscale value, so that the relationship between the brightness and the luminance information is a linear relationship as indicated, for example, by F1. On the other hand, it is known from Weber-Fechner's law that the relationship between human brightness perception and the luminance information is expressed by a logarithmic function indicated by F2. In the graph of F2, let H1 be the luminance information, and H2 be the standard value of the human brightness perception for the luminance information of H1. For example, when the luminance information on the horizontal axis is 8 bits, and H2=0.5, H1 is approximately around 4 bits. That is, when the value of the upper 4 bits of the luminance information, which is formed of 8 bits, is greater than or equal to 1, the value of the graph in FIG. 11 on the vertical axis is greater than 0.5. That is, under the assumption that light corresponding to value of the graph in FIG. 11 on the vertical axis being greater than 0.5 is the bright light and humans can recognize the light, humans can recognize that light based on luminance information in which the value of the upper 4 bits of the luminance information formed of 8 bits is greater than or equal to 1 is the "bright light". Similarly, for example, light based on luminance information in which the value of the upper 5 bits of the luminance information formed of 10 bits is greater than or equal to 1 can be perceived by humans as the bright light.

As described above, evaluating whether the value of the upper m/2 bits of the m-bit luminance information is greater than or equal to 1 or 0 allows determination of whether the light from the light sources based on the luminance information is the "bright light" or the "dark light. The method described above is also applicable to the number of upper bits in steps S190 and S290 having been described above with reference to FIG. 3. The constant m may be an odd number in the present embodiment, but setting m at an even number makes the application of the method according to the present embodiment easier. That is, in the circuit apparatus 100 according to the present embodiment, the upper bits of the luminance information are the upper m/2 bits out of the m bits in a case where the number of bits of the luminance information is m (m is even number greater than or equal to 2). The range of the upper bits of the luminance information can thus be set appropriately. On the assumption that humans can recognize that light corresponding to value of the graph in FIG. 11 on the vertical axis being greater than 0.6 is the bright light, humans can recognize that light based on luminance information in which the value of the upper 3 bits of the luminance information formed of 8 bits is greater than or equal to 1 is the "bright light".

For example, when the luminance information evaluated in step S330 is luminance information based on the "bright light", a value of 1 is added to each of the lower bits of the luminance information in step S340. For example, assume that q=12, m=8, k=2, and p=2, and that the lower bit setting section 170 receives information indicating that the light is the "bright light" from the bright/dark level evaluation section 180 and receives luminance information of 11111111 (=255) from the luminance information extraction section 120. In this case, "11" is added to the luminance information, and the result of the addition is transmitted as 1111111111 (=1024) to the dithering section 130. The fact that the luminance information is information on the "bright light" can thus be clarified.

On the other hand, for example, when the luminance information evaluated in step S330 is luminance information based on the "dark light", the lower bit setting section 170 adds in step S340 a value of 0 to each of the lower bits of the luminance information in step S340. For example, assume that q=12, m=8, k=2, and p=2, and that the lower bit setting section 170 receives information indicating that the light is the "dark light" from the bright/dark level evaluation section 180 and receives luminance information of 00000000 (=0) from the luminance information extraction section 120. In this case, "00" is added to the luminance information to change it to 0000000000 (=0). The fact that the luminance information is information on the "dark light" can thus be clarified.

Thereafter, although not shown, the lower bit setting section 170 carries out the process of transmitting the luminance information with the p-bit value added to the lower part thereof to the dithering section 130. In the example in FIG. 9, the luminance information transmitted from the lower bit setting section 170 to the dithering section 130 is denoted as CQ. When q=m+k+p is satisfied, the value of CQ is a value to which the lower p bits of the luminance information indicated by C are added. The value of CQ is otherwise equal to the value of CK in FIG. 7.

The circuit apparatus 100 then executes step S350 and terminates the procedure. For example, the dithering section 130 having received the luminance information indicated by CQ adds 2 bits, which are bits for dithering, to the luminance information and transmits the resultant information as 12-bit output luminance information to the processing apparatus 3.

In FIG. 9, the output luminance information to which the bits for the dithering have been added is denoted as CQD. In the example in FIG. 9, the upper bits transmitted to the upper bit comparison section 150 by the subsequent upper bit extraction (step S390) is the value indicated by CD1, as in FIG. 7.

As described above, the circuit apparatus 100 according to the present embodiment further includes the bright/dark level evaluation section 180, which evaluates whether the image information is on a bright or dark image based on the luminance information. When the number of bits of the luminance information is m (m is integer greater than or equal to 2), the number of bits for dithering is k (k is integer greater than or equal to 1), and the number of processed bits is m+k+p (p is integer greater than or equal to 1), the lower bit setting section 170 adds lower bits the number of which is p according to the result of the evaluation performed by the bright/dark level evaluation section 180 to the luminance information. Luminance information formed of an appropriate amount of information can thus be transmitted to the dithering section 130 when the number of bits processed by the processing apparatus 3 is greater than the sum of the number of bits of the luminance information and the number of bits for dithering.

Figure 12:
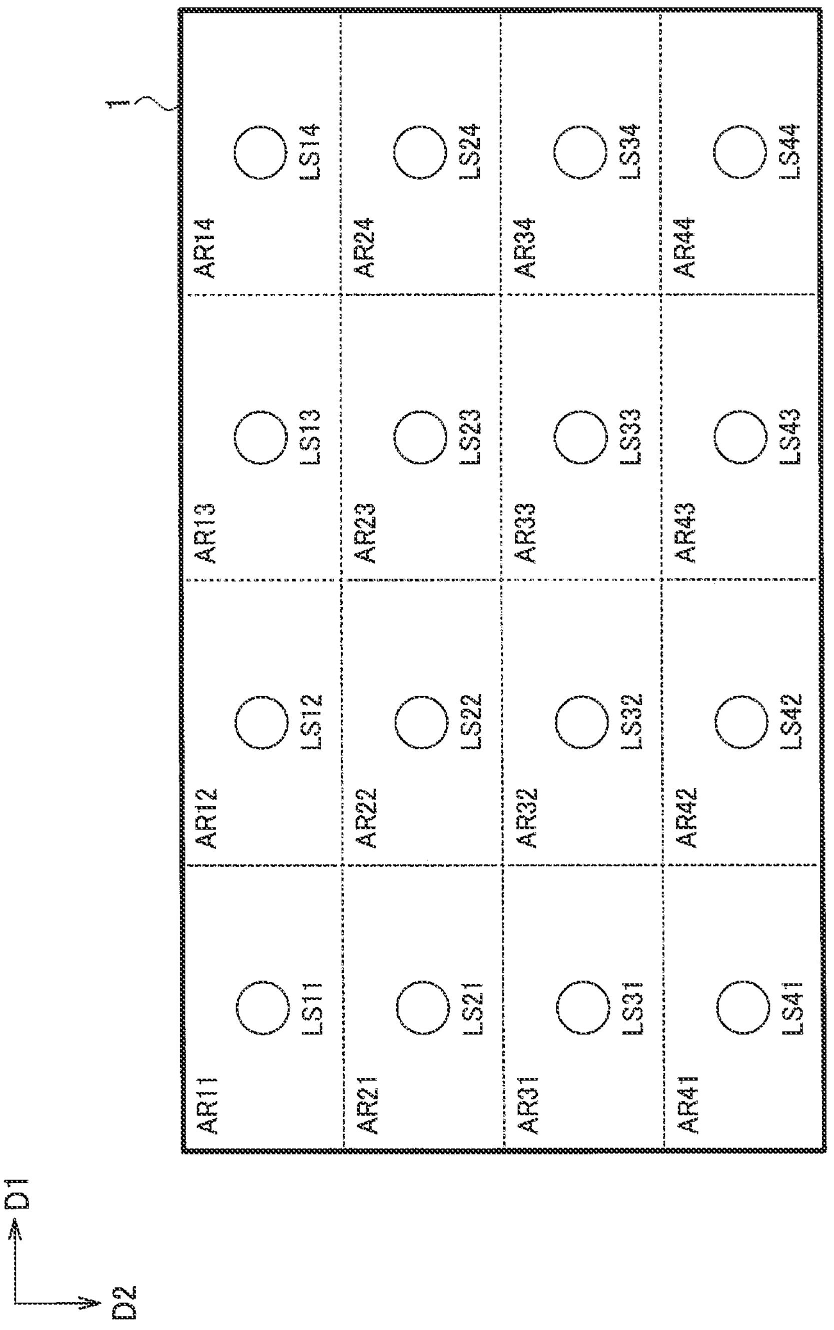
FIG. 12 describes how to divide a display region.

The method according to the present embodiment is not limited to the method described above. For example, the display apparatus 10 may be divided into a plurality of areas AR, and the method according to the present embodiment may be applied to each of the divided areas AR. For example, in FIG. 12, the backlight 1 includes a light source LS11, a light source LS12, a light source LS13, a light source LS14, a light source LS21, a light source LS22, a light source LS23, a light source LS24, a light source LS31, a light source LS32, a light source LS33, a light source LS34, a light source LS41, a light source LS42, a light source LS43, and a light source LS44. That is, the method according to the present embodiment may be applied to the display areas of the display apparatus 10 divided in correspondence with the arrangement of the light sources LS11 to LS44. To simplify the description, the backlight 1, the electro-optical panel 5, and the display apparatus 10 are assumed to have the same area. The display area corresponding to the light source LS11 is called an area AR11. That is, the display area of the display apparatus 10 can be divided into the area AR11, an area AR12, an area AR13, an area AR14, an area AR21, an area AR22, an area AR23, an area AR24, an area AR31, an area AR32, an area AR33, an area AR34, an area AR41, an area AR42, an area AR43, and an area AR44. It is assumed in FIG. 12 that 4 light sources are arranged along a direction D1 on a row basis and 4 light sources are arranged along a direction D2 on a column basis only by way of example. The areas AR are used by the circuit apparatus 100 to carry out the processes, and there is no boundary between the areas AR in a display image actually displayed on the electro-optical panel 5. It is assumed in the present embodiment that the light intensity distribution of the light from the light sources is not considered.

Figure 13:
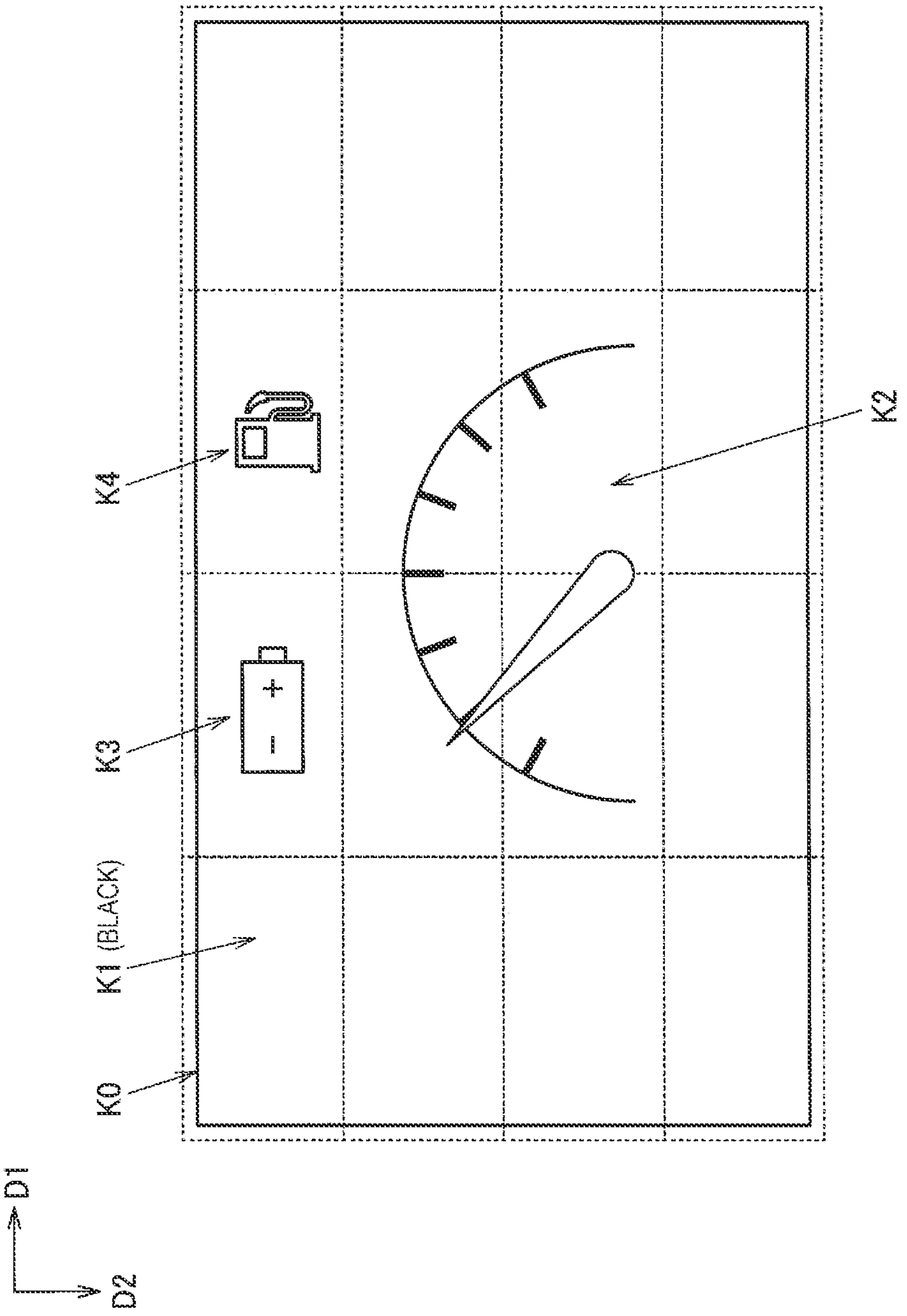
FIG. 13 describes an example of image information.

For example, when the display system 200 is used for automotive applications, the predetermined device outputs the image information shown in FIG. 13 to the circuit apparatus 100. The regions indicated by the dotted lines in FIG. 13 correspond to the areas AR11 to AR44 in FIG. 12. The image information is information at each pixel in the regions labeled with K1, which are within the solid line labeled with K0, and includes, for example, a meter image labeled with K2 and warning light images labeled with K3 and K4. For clarity of the display, the regions other than the images labeled with K2, K3, and K4 are black images ((R, G, B)=(0, 0, 0)) as the initial image, although the regions are not colored. The image of the meter labeled with K2 is assumed to be a white image ((R, G, B)=(255, 255, 255)). It is further assumed that the image of the warning light labeled with K3 is a yellow image ((R, G, B)=(255, 255, 0)) and the image of the warning light labeled with K4 is a red image ((R, G, B)=(255, 0, 0)).

For example, when the predetermined instrument including the display system 200 is activated, the predetermined device outputs image information on an image that is superimposition of the initial image and the meter image labeled with K2 to the circuit apparatus 100. The circuit apparatus then carries out the processes in FIG. 2 for each of the areas AR11 to AR44. For example, since only the black initial image ((R, G, B)=(0, 0, 0)) is displayed in the area AR11, the luminance information is 0 as described above, and the output luminance information to which the bits for dithering based on 0 have been added is transmitted to the processing apparatus 3. The light source LS11 corresponding to the area AR11 thus practically does not emit light. The same holds true for the areas AR12, AR13, AR14, AR21, AR24, AR31, AR34, AR41, AR42, AR43, and AR44. On the other hand, the areas AR22, AR23, AR32, and AR33 contain the white ((R, G, B)=(255, 255, 255)) meter image, so that 255 is extracted as the color information in the color information extraction (step S20). As a result, the luminance information extracted by the luminance information extraction (step S200) becomes 255, and the output luminance information having undergone the dithering (step S300) based on the luminance information is transmitted to the display apparatus 10. The light sources LS22, LS23, LS32, and LS33 are thus turned on. As described above, in the circuit apparatus 100 according to the present embodiment, the luminance information extraction section 120 extracts the luminance information from the color information for each of the plurality of areas AR of the electro-optical panel 5. The luminance information can thus be grasped for each of the areas AR, into which the display apparatus 10 is segmented.

In addition, the color correction (step S100) is performed on the image information in the areas AR22, AR23, AR32, and AR33. That is, the areas AR22, AR23, AR32, and AR33 are so controlled that a white color tone is produced as the meter image. To check whether the sticking has occurred in the light sources LS22, LS23, LS32, and LS33, the value of Aγ1 is output from the image color correction section 140 to the upper bit comparison section 150. As described above, in the circuit apparatus 100 according to the present embodiment, the image color correction section 140 outputs the upper bits of the output image information to the upper bit comparison section 150 for each of the plurality of areas AR of the electro-optical panel 5. The output image information can thus be grasped for each of the areas AR, into which the display apparatus 10 is segmented.

For example, when an event relating to the warning light labeled with K3 is sensed, the predetermined device transmits image information to which the image labeled with K3 has been added to the circuit apparatus 100. As a result, in the area AR12, color information containing a bright color is extracted by the color information extraction (step S20), luminance information on the luminance of bright light is extracted by the luminance information extraction (step S200), and output luminance information based on the bright light is transmitted to the display apparatus 10 by the dithering (step S300). The light source LS12 is thus turned on, and the user can clearly recognize the yellow warning light labeled with K3 in the area AR12. In the event of the sticking, even when the user cannot recognize the yellow warning light labeled with K3, the method according to the present embodiment allows the user to quickly recognize the event relating to the warning light. The user can thus quickly and appropriately take measured against the event relating to the warning light.

Similarly, when an event relating to the warning light labeled with K4 is sensed, the user can clearly recognize the red warning light labeled with K4 in the area AR13. In the event of the sticking, even when the user cannot recognize the red warning light labeled with K4, the method according to the present embodiment allows the user to quickly recognize the event relating to the warning light. The user can thus quickly and appropriately take measured against the event relating to the warning light.

The display system 200 according to the present embodiment can be implemented, for example, as a variation in which another configuration is added. For example, although not shown, the display system 200 may further include a distortion correction IC. In this case, the distortion-correction IC performs distortion correction on the image information generated by the predetermined device, and the image information having undergone the distortion correction is transmitted to the circuit apparatus 100. In this case, the image information shown in FIG. 13 described above is transmitted, for example, as the image information shown in FIG. 14 to the circuit apparatus 100. The outer shape of the image information labeled with K0 is distorted, as labeled with K10. Similarly, the meter image labeled with K2 becomes the shape labeled with K12, the warning light image labeled with K3 becomes the shape labeled with K13, and the warning light image labeled with K4 becomes the shape labeled with K14. An HUD can thus be configured by combining, for example, a mirror, a transparent screen, and other components none of which is shown with each other, and an image having an appropriate shape can be projected on the transparent screen. The transparent screen is, for example, an automobile windshield.

Figure 14:
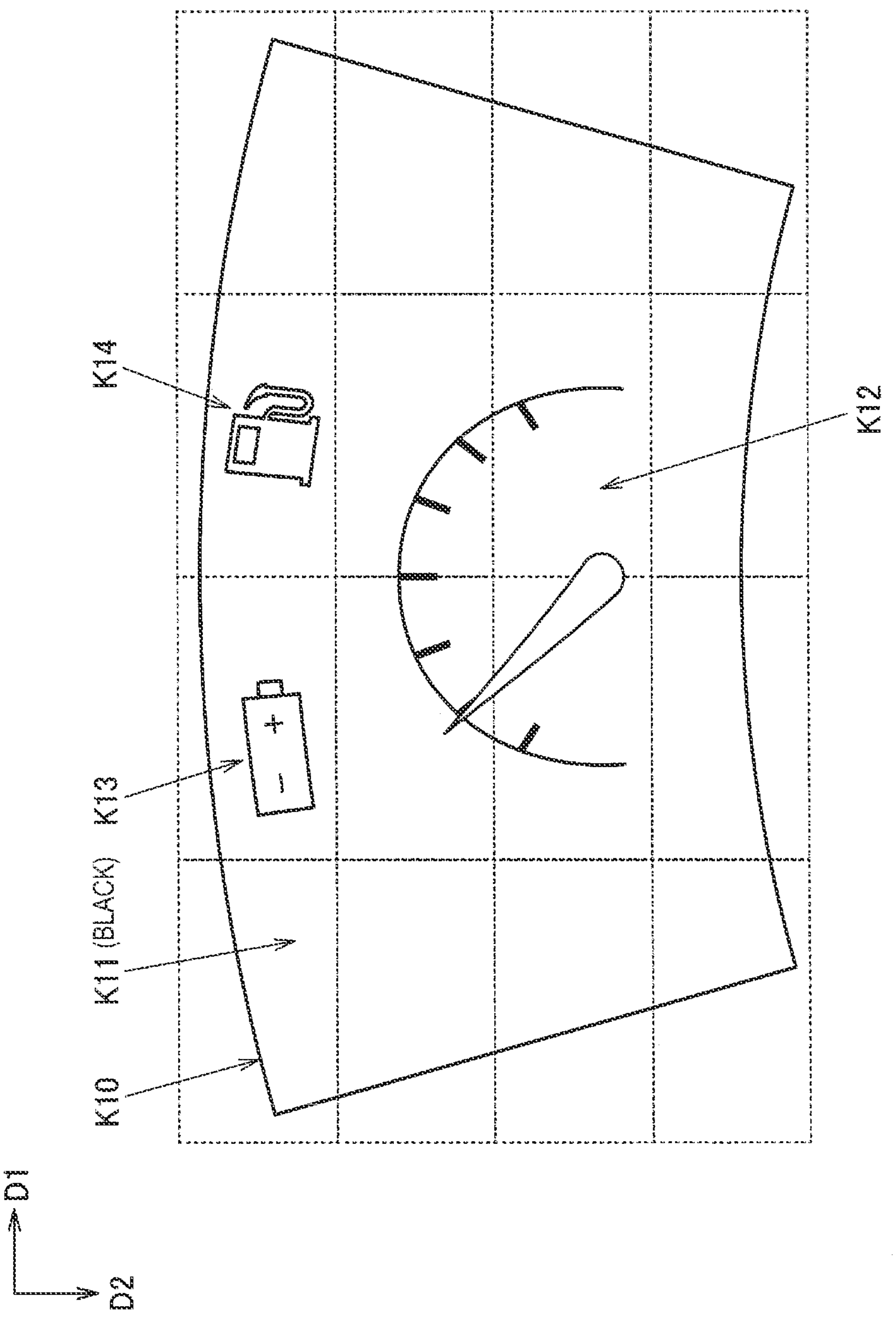
FIG. 14 describes an example of the image information having undergone distortion correction.

In FIG. 14, for example, the image labeled with K12 is disposed in the areas AR22, AR23, AR32, and AR33, as the image labeled with K2 in FIG. 13 is. Similarly, the image labeled with K13 is disposed in the area AR12, as the image labeled with K3 in FIG. 13 is. Similarly, the image indicated by K14 is disposed in the area AR13, as the image indicated by K4 in FIG. 13 is. Changing the image information in FIG. 13 to that in FIG. 14 therefore does not change the area where whether the sticking has occurred needs to be checked. The distortion correction may, however, change the arrangement of the images, in which case the area that needs to be checked for the sticking is changed appropriately.

As described above, a circuit apparatus according to the present embodiment controls a display apparatus including a backlight and an electro-optical panel, and includes a color information extraction section, a luminance information extraction section, a dithering section, an image color correction section, and an upper bit comparison section. The color information extraction section extracts color information from image information. The luminance information extraction section extracts luminance information for controlling the luminance of the backlight based on the color information. The dithering section adds bits for dithering to the lower bit side of the luminance information and outputs the luminance information after the addition to the display apparatus as output luminance information. The image color correction section corrects the color of the image information and outputs the corrected image information as output image information to the display apparatus. The upper bit comparison section compares upper bits of the luminance information, the upper bits of the output luminance information, and the upper bits of the output image information with each other.

As described above, in the circuit apparatus according to the present embodiment, comparing the upper bits of the luminance information, the upper bits of the output luminance information, and the upper bits corresponding to the output image information with each other allows detection of whether the sticking has occurred at an appropriate timing.

In the present embodiment, the upper bit comparison section may output a first error detection signal when the results of the comparison between the upper bits of the luminance information, the upper bits of the output luminance information, and the upper bits of the output image information show that the three sets of upper bits disagree with one another.

The user can thus quickly recognize that the sticking has occurred.

The circuit apparatus according to the present embodiment may further include a preceding and following frame comparison section that compares the output luminance information for the (N−1)-th frame with the output luminance information for the N-th frame, where N is an integer greater than or equal to 2.

Whether the sticking has occurred can thus be grasped on a frame update timing basis.

In the present embodiment, the preceding and following frame comparison section may output a second error detection signal when the output luminance information for the (N−1)-th frame is identical to the output luminance information for the N-th frame.

The user can thus quickly grasp that the dithering is not functioning properly.

In the present embodiment, the luminance information extraction section may extract the luminance information based on a color component having highest luminance out of a plurality of color components in the color information.

Luminance information for controlling a light source of the display apparatus, which displays the image information for displaying colors including the plurality of color components, can thus be extracted appropriately.

In the present embodiment, the image color correction section may output the upper bits of the output image information to the upper bit comparison section based on the color component having the largest value among the plurality of color components in the output image information.

The image color correction section can thus appropriately extract the upper bits of the output image information containing the plurality of color components and transmit the extracted upper bits to the upper bit comparison section.

In the present embodiment, the luminance information extraction section may extract the luminance information from the color information for each of a plurality of areas of the electro-optical panel.

The luminance information can thus be grasped for each of the areas into which the display apparatus is segmented.

In the present embodiment, the image color correction section may output the upper bits of the output image information to the upper bit comparison section for each of the plurality of areas of the electro-optical panel.

The output image information can thus be grasped for each of the areas into which the display apparatus is segmented.

In the present embodiment, the upper bits of the luminance information may be upper m/2 bits out of m bits, where m is the number of bits of the luminance information (m is even number greater than or equal to 2).

The range of the upper bits of the luminance information can thus be set appropriately.

In the present embodiment, the circuit apparatus may further include a lower bit setting section that carries out the process of setting lower bits of the luminance information from the luminance information extraction section in accordance with the number of bits processed by a processing apparatus that controls the backlight based on the output luminance information, and outputs the set luminance information to the dithering section.

The sticking can thus be quickly detected when the number of bits processed by the processing apparatus differs from the number of bits of the luminance information.

In the present embodiment, when the number of bits processed by the processing apparatus is m, the lower bit setting section may output the luminance information from which lower k bits are deleted to the dithering section, where m represents the number of bits of the luminance information (m is integer greater than or equal to 2), and k represents the number of bits for dithering (k is integer greater than or equal to 1).

Luminance information formed of an appropriate amount of information can thus be transmitted to the dithering section when the number of bits processed by the processing apparatus is equal to the number of bits of the luminance information.

In the present embodiment, when the number of bits processed by the processing apparatus is m+k, the lower bit setting section may output the luminance information without deletion of the lower bits to the dithering section, where m represents the number of bits of the luminance information (m is integer greater than or equal to 2), and k represents the number of bits for dithering (k is integer greater than or equal to 1).

Luminance information formed of an appropriate amount of information can thus be transmitted to the dithering section when the number of bits processed by the processing apparatus is handled as the sum of the number of bits of the luminance information and the number of bits for dithering.

In the present embodiment, the circuit apparatus may further include a bright/dark level evaluation section that evaluates whether the image information is on a bright or dark image based on the luminance information. The lower bit setting section may add lower bits the number of which is p according to the result of the evaluation performed by the bright/dark level evaluation section to the luminance information, where m represents the number of bits of the luminance information (m is integer greater than or equal to 2), k represents the number of bits for dithering (k is integer greater than or equal to 1), and m+k+p represents the number of processed bits (p is integer greater than or equal to 1).

Luminance information formed of an appropriate amount of information can thus be transmitted to the dithering section when the number of bits processed by the processing apparatus is greater than the sum of the number of bits of the luminance information and the number of bits for dithering.

A display system according to the present embodiment includes the circuit apparatus and the display apparatus described above.

The present embodiment has been described above in detail, and a person skilled in the art will readily appreciate that a large number of variations are conceivable to the extent that they do not substantially depart from the novel items and effects of the present disclosure. Such variations are all therefore assumed to fall within the scope of the present disclosure. For example, a term described at least once in the specification or the drawings along with a different term having a broader meaning or the same meaning can be replaced with the different term anywhere in the specification or the drawings. Furthermore, all combinations of the present embodiment and the variations fall within the scope of the present disclosure. Moreover, the configuration, operation, and other factors of each of the circuit apparatus, the display system, and the like are not limited to those described in the present embodiment and can be changed in a variety of manners.

What is claimed is:

1. A circuit apparatus that controls a display apparatus including a backlight and an electro-optical panel, the circuit apparatus comprising:
- a color information extraction section that extracts color information from image information;
- a luminance information extraction section that extracts luminance information for controlling luminance of the backlight based on the color information;
- a dithering section that adds bits for dithering to a lower bit side of the luminance information and outputs the luminance information after the addition to the display apparatus as output luminance information;
- an image color correction section that corrects a color of the image information and outputs the corrected image information as output image information to the display apparatus; and
- an upper bit comparison section that compares upper bits of the luminance information, upper bits of the output luminance information, and upper bits of the output image information with each other.

2. The circuit apparatus according to claim 1,
- wherein the upper bit comparison section outputs a first error detection signal when results of the comparison between the upper bits of the luminance information, the upper bits of the output luminance information, and the upper bits of the output image information show that the three sets of upper bits disagree with one another.

3. The circuit apparatus according to claim 1, further comprising
- a preceding and following frame comparison section that compares the output luminance information for an (N−1)-th frame with the output luminance information for an N-th frame, where N is an integer greater than or equal to 2.

4. The circuit apparatus according to claim 3,
- wherein the preceding and following frame comparison section outputs a second error detection signal when the output luminance information for the (N−1)-th frame is identical to the output luminance information for the N-th frame.

5. The circuit apparatus according to claim 1,
- wherein the luminance information extraction section extracts the luminance information based on a color component having highest luminance out of a plurality of color components in the color information.

6. The circuit apparatus according to claim 1,
- wherein the image color correction section outputs the upper bits of the output image information to the upper bit comparison section based on a color component having a largest value among a plurality of color components in the output image information.

7. The circuit apparatus according to claim 1, wherein the luminance information extraction section extracts the luminance information from the color information for each of a plurality of areas of the electro-optical panel.

8. The circuit apparatus according to claim 1, wherein the image color correction section outputs the upper bits of the output image information to the upper bit comparison section for each of a plurality of areas of the electro-optical panel.

9. The circuit apparatus according to claim 1, wherein the upper bits of the luminance information are upper m/2 bits out of m bits, where m is a number of bits of the luminance information (m is even number greater than or equal to 2).

10. The circuit apparatus according to claim 1, further comprising a lower bit setting section that carries out process of setting lower bits of the luminance information from the luminance information extraction section in accordance with a number of bits processed by a processing apparatus that controls the backlight based on the output luminance information, and outputs the set luminance information to the dithering section.

11. The circuit apparatus according to claim 10, wherein when the number of bits processed by the processing apparatus is m, the lower bit setting section outputs the luminance information from which lower k bits are deleted to the dithering section, where m represents a number of bits of the luminance information (m is integer greater than or equal to 2), and k represents a number of bits for dithering (k is integer greater than or equal to 1).

12. The circuit apparatus according to claim 10, wherein when the number of bits processed by the processing apparatus is m+k, the lower bit setting section outputs the luminance information without deletion of lower bits to the dithering section, where m represents a number of bits of the luminance information (m is integer greater than or equal to 2), and k represents a number of bits for dithering (k is integer greater than or equal to 1).

13. The circuit apparatus according to claim 10, further comprising a bright/dark level evaluation section that evaluates whether the image information is on a bright or dark image based on the luminance information, wherein the lower bit setting section adds lower bits a number of which is p according to a result of the evaluation performed by the bright/dark level evaluation section to the luminance information, where m represents a number of bits of the luminance information (m is integer greater than or equal to 2), k represents a number of bits for dithering (k is integer greater than or equal to 1), and m+k+p represents the number of bits processed by the processing apparatus (p is integer greater than or equal to 1).

14. A display system comprising:

the circuit apparatus according to claim 1; and the display apparatus.

* * * * *